(12) United States Patent
Forster

(10) Patent No.: US 12,093,759 B2
(45) Date of Patent: Sep. 17, 2024

(54) RADIO FREQUENCY IDENTIFICATION TAGS FOR THREE DIMENSIONAL OBJECTS

(71) Applicant: Avery Dennison Retail Information Services LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 31 days.

(21) Appl. No.: 17/789,288

(22) PCT Filed: Dec. 28, 2020

(86) PCT No.: PCT/US2020/067206
§ 371 (c)(1),
(2) Date: Jun. 27, 2022

(87) PCT Pub. No.: WO2021/134073
PCT Pub. Date: Jul. 1, 2021

(65) Prior Publication Data
US 2023/0041491 A1 Feb. 9, 2023

Related U.S. Application Data

(60) Provisional application No. 62/954,482, filed on Dec. 28, 2019.

(51) Int. Cl.
*G06K 19/06* (2006.01)
*G06K 1/12* (2006.01)
(Continued)

(52) U.S. Cl.
CPC ............ *G06K 1/12* (2013.01); *G06K 19/0775* (2013.01); *H01Q 1/2225* (2013.01); *H01Q 1/38* (2013.01)

(58) Field of Classification Search
CPC ........... G06K 19/07749; G06K 19/077; G06K 19/07756; G06K 19/07754;
(Continued)

(56) References Cited

U.S. PATENT DOCUMENTS 4,792,965 A 12/1988 Morgan
5,491,715 A 2/1996 Flaxl
(Continued)

FOREIGN PATENT DOCUMENTS

CN 206289207 U 6/2017
DE 10357467 6/2005
(Continued)

OTHER PUBLICATIONS

International Preliminary Report on Patentability dated Jun. 28, 2022 issued in corresponding IA No. PCT/US2020/067206 filed Dec. 28, 2020.
(Continued)

*Primary Examiner* — Daniel St Cyr

(57) ABSTRACT

In some embodiments, a method of manufacturing a radio frequency identification (RFID) tag on a target surface of a non-planar object may be provided. The method may include positioning an antenna on the target surface of the non-planar object, positioning a reactive RFID strap on the target surface, and coupling the reactive RFID strap to the antenna to induce an antenna response.

17 Claims, 18 Drawing Sheets

(51) Int. Cl.
*G06K 19/077* (2006.01)
*H01Q 1/22* (2006.01)
*H01Q 1/38* (2006.01)

(58) Field of Classification Search
CPC ....... G06K 19/07722; G06K 19/07775; G06K 19/07745
USPC ................................................. 235/492, 487
See application file for complete search history.

(56) References Cited

U.S. PATENT DOCUMENTS

| | | | |
|---|---|---|---|
| 6,163,260 | A | 12/2000 | Conwell et al. |
| 6,294,998 | B1 | 9/2001 | Adams et al. |
| 6,407,669 | B1 | 6/2002 | Brown et al. |
| 7,158,033 | B2 | 1/2007 | Forster |
| 7,333,061 | B2 | 2/2008 | Liu et al. |
| 7,551,141 | B1 | 6/2009 | Hadley et al. |
| 7,954,228 | B2 | 6/2011 | Kobayashi et al. |
| 8,462,052 | B2 | 6/2013 | Yamagajo et al. |
| 9,087,282 | B1 | 7/2015 | Hyde et al. |
| 9,412,061 | B2 | 8/2016 | Forster |
| 9,812,782 | B2 | 11/2017 | Finn et al. |
| 10,311,351 | B1 * | 6/2019 | Diorio ............... H01L 24/95 |
| 10,331,993 | B1 * | 6/2019 | Koepp ............ G06K 19/07754 |
| 10,373,045 | B2 | 8/2019 | Forster |
| 2004/0177492 | A1 | 9/2004 | Eckstein et al. |
| 2005/0093678 | A1 | 5/2005 | Forster et al. |
| 2005/0221704 | A1 | 10/2005 | Conwell et al. |
| 2006/0037502 | A1 | 2/2006 | Warther |
| 2006/0044769 | A1 | 3/2006 | Forster et al. |
| 2006/0237544 | A1 | 10/2006 | Matsuura et al. |
| 2006/0290512 | A1 | 12/2006 | Shanton |
| 2007/0182566 | A1 | 8/2007 | Kim et al. |
| 2007/0210924 | A1 | 9/2007 | Arnold et al. |
| 2007/0240304 | A1 | 10/2007 | Eisenhardt et al. |
| 2007/0283556 | A1 | 12/2007 | Wehr |
| 2008/0024276 | A1 | 1/2008 | Volpi et al. |
| 2008/0068176 | A1 | 3/2008 | Azuma et al. |
| 2008/0150719 | A1 | 6/2008 | Cote et al. |
| 2009/0002130 | A1 | 1/2009 | Kato |
| 2009/0109002 | A1 | 4/2009 | Hadley et al. |
| 2009/0164954 | A1 | 6/2009 | Yamagajo et al. |
| 2009/0273474 | A1 | 11/2009 | Nonaka |
| 2010/0051703 | A1 | 3/2010 | Kobae |
| 2010/0052859 | A1 | 3/2010 | Lossau |
| 2010/0123553 | A1 | 5/2010 | Banerjee et al. |
| 2011/0063184 | A1 | 3/2011 | Furumura et al. |
| 2012/0085672 | A1 | 4/2012 | Gelardi et al. |
| 2015/0278675 | A1 | 10/2015 | Finn et al. |
| 2018/0123220 | A1 | 5/2018 | Forster |
| 2018/0211499 | A1 | 7/2018 | Forster |
| 2019/0180158 | A1 | 6/2019 | Yase et al. |
| 2019/0205714 | A1 | 7/2019 | Forster |
| 2019/0208636 | A1 | 7/2019 | Kato |
| 2019/0385039 | A1 * | 12/2019 | Dyche ................ G06K 19/0723 |
| 2020/0184300 | A1 * | 6/2020 | Forster ................. G01K 1/024 |
| 2022/0391655 | A1 | 12/2022 | Forster |

FOREIGN PATENT DOCUMENTS

| | | |
|---|---|---|
| EP | 1717904 | 11/2006 |
| EP | 1865574 | 12/2007 |
| JP | 2002-321725 | 11/2002 |
| JP | 2003-99719 | 4/2003 |
| JP | 2003-224415 | 8/2003 |
| JP | 2004-120188 | 4/2004 |
| JP | 2006-521632 | 9/2006 |
| JP | 2006-304184 | 11/2006 |
| JP | 2007-208993 | 8/2007 |
| JP | 2008-72437 | 3/2008 |
| JP | 2009-169933 | 7/2009 |
| JP | 2010-21840 | 1/2010 |
| JP | 2010-55143 | 3/2010 |
| JP | 2010-86166 | 4/2010 |
| JP | 2010-515119 | 5/2010 |
| JP | 2010-135945 | 6/2010 |
| JP | 2010-147912 | 7/2010 |
| JP | 2012-173942 | 9/2012 |
| JP | 2013-145450 | 7/2013 |
| JP | 2015-130056 | 7/2015 |
| JP | 2019-533860 | 11/2019 |
| WO | 2003/065303 | 8/2003 |
| WO | 2006/059366 | 11/2004 |
| WO | 2007/109891 | 10/2007 |
| WO | 2007/116830 | 10/2007 |
| WO | 2007/122870 | 11/2007 |
| WO | 2009/000446 | 12/2008 |
| WO | 2015/177490 | 11/2015 |
| WO | 2016/190008 | 12/2016 |
| WO | 2018/155382 | 8/2018 |

OTHER PUBLICATIONS

"Speakout RFID Tags," https://bones.ch/media/downloads-support/FAQ/eng/RFID_Tags_E.pdf Bones Inc., 2016, 2 pages.
"Introduction to Retail RFID Technology, Part 3—Tags," http://www.rfidarena.com/2016/1/7/introduction-to-retail-rfid-technology,-part-3-tags.aspx, Nordic ID Tech Geek, Jan. 7, 2016, 3 pages.
"Dig Deep—Construction of RFID Tags," https://rfid4u.com/rfid-basics-resources/dig-deep-rfid-tags-construction/, RFID4U, 2016, 6 pages.
"Low Price Competitive Price Warehousing Management Hang-on RFID Tags For Jewelry and Ticket In China Manufacturers and Suppliers," http://www.sinolabelings.com/rfid-label/warehousing-management-rfid-labels/competitive-price-warehousing-management-hang-on-r.html, Xiamen JinBar Information Technology Co. Ltd., downloaded Jul. 24, 2018, 12 pages.
International Search Report and Written Opinion dated May 4, 2021 issued in corresponding IA No. PCT/US2020/067206 filed Dec. 28, 2020.

* cited by examiner

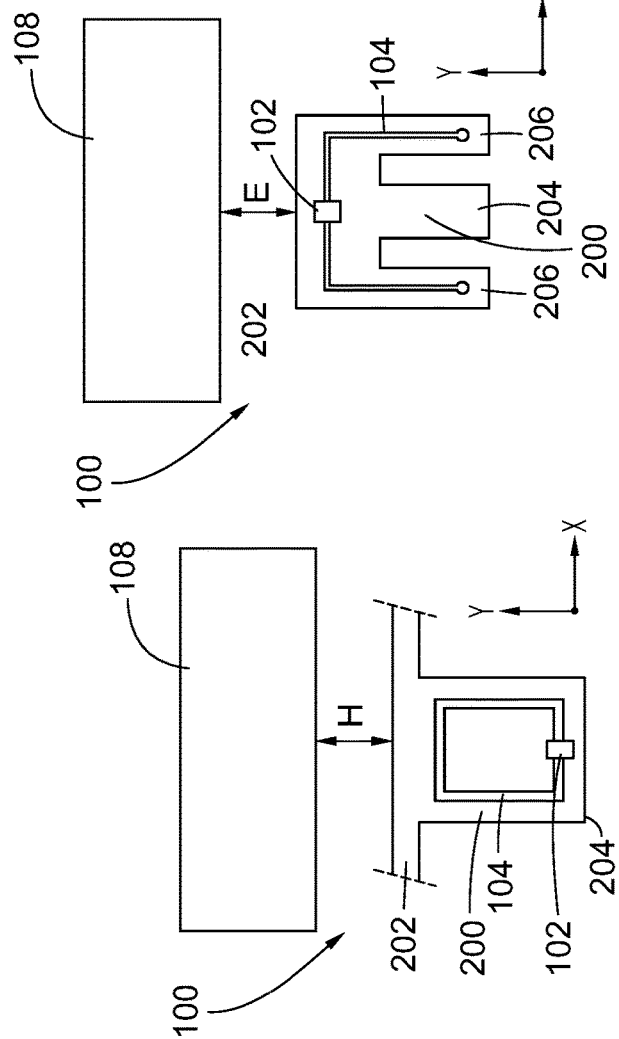
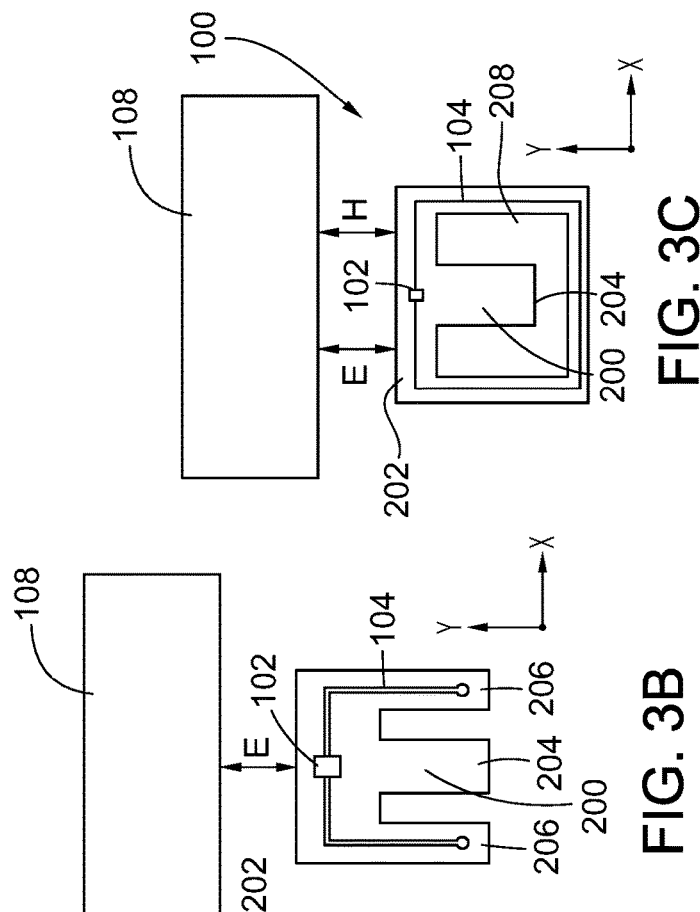
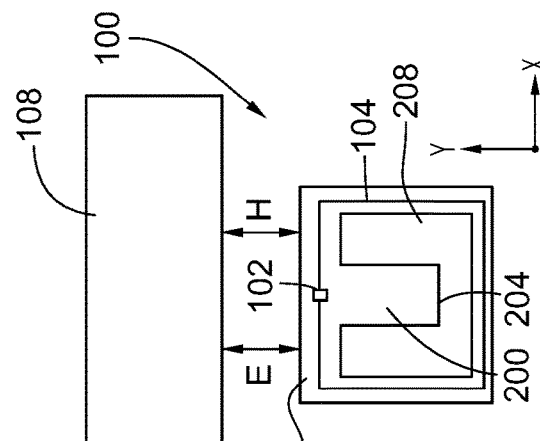
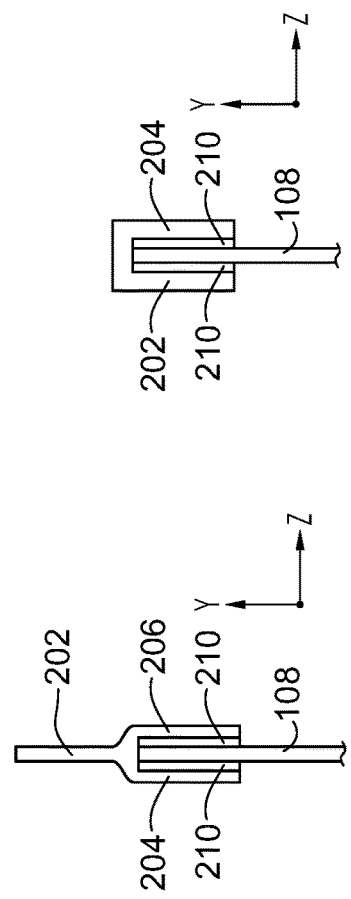
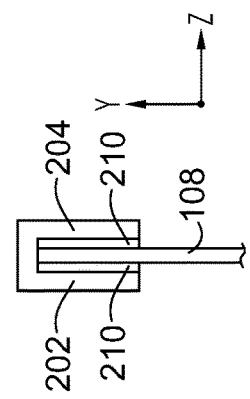

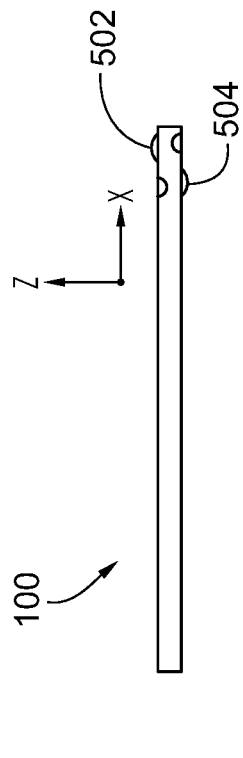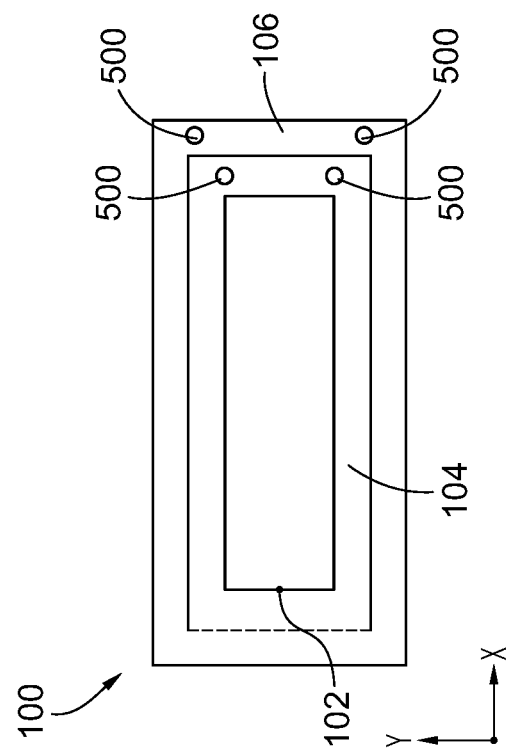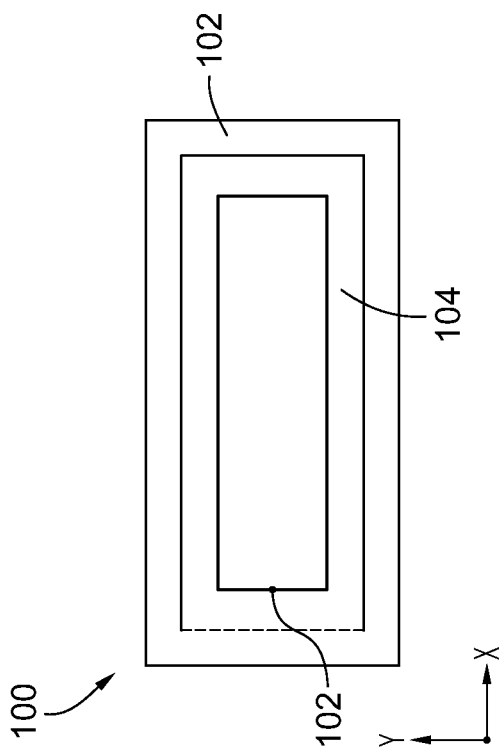

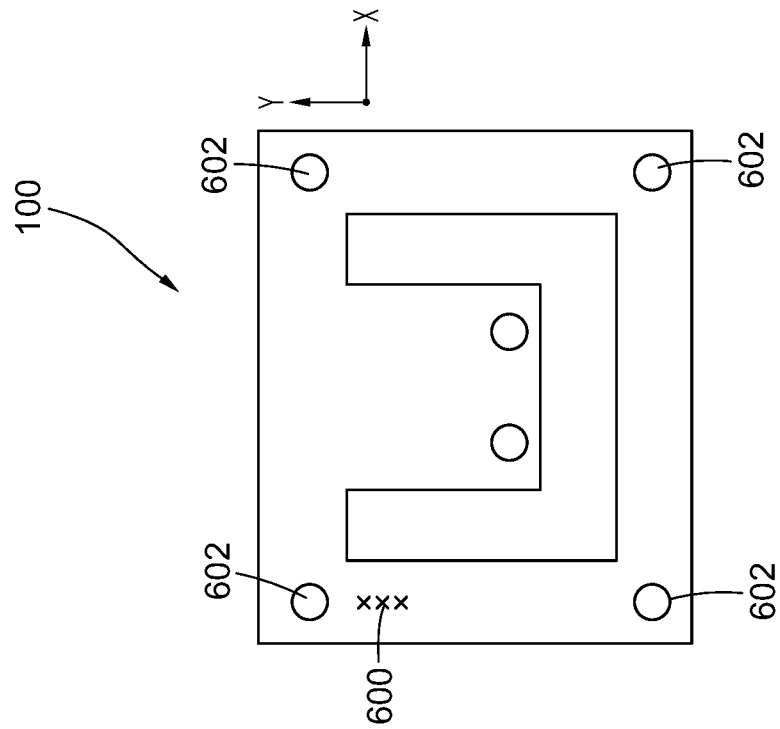
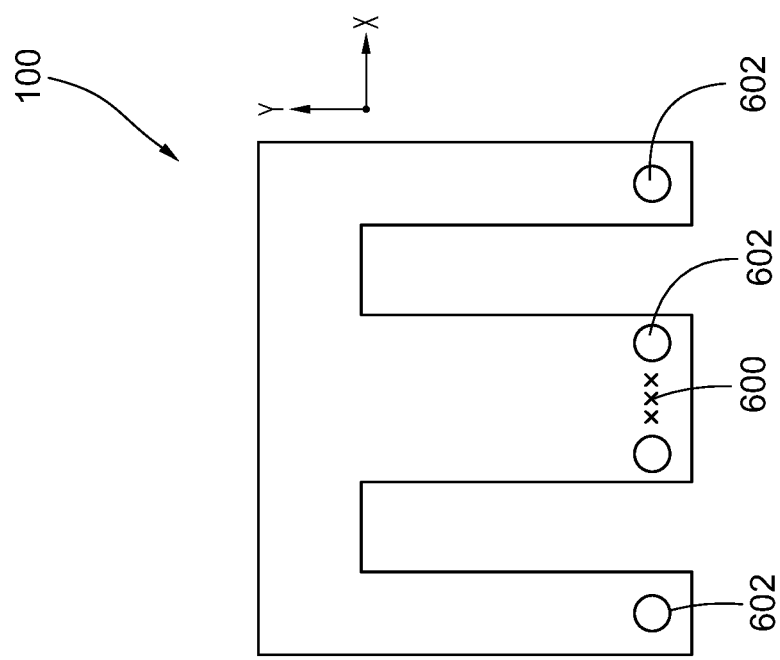
FIG. 6B
FIG. 6A

RADIO FREQUENCY IDENTIFICATION TAGS FOR THREE DIMENSIONAL OBJECTS

CROSS-REFERENCE TO RELATED APPLICATION

The present application is a 371 of International Application No. PCT/US2020/067206, which was published in English on Jul. 1, 2021, and claims the benefit of U.S. Provisional Patent Application No. 62/954,482 filed Dec. 28, 2019, both of which are incorporated herein by reference in their entireties.

BACKGROUND

Generally stated, radio-frequency identification is the use of electromagnetic energy to stimulate a responsive device (known as an RFID "tag" or transponder) to identify itself and, in some cases, provide additional information and/or data stored in the tag. RFID tags typically comprise a semiconductor device commonly referred to as the "chip", upon which are formed a memory and an operating circuitry, which is connected to an antenna. Typically, RFID tags act as transponders, providing information stored in the chip memory in response to a radio frequency interrogation signal received from a reader, also referred to as an interrogator. In the case of passive RFID devices, the energy of the interrogation signal also provides the necessary energy to operate the RFID tag device.

As referenced above, RFID tags are generally formed by connecting an RFID chip to some form of antenna. Antenna types are very diverse, as are the methods of constructing the same. One particularly advantageous method of making RFID tags is to use a strap, a small device with an RFID chip connected to two or more conductors that can be coupled to an antenna. The coupling of the conductors to the antenna can be achieved using a conductive connection, an electric field connection, magnetic connection or a combination of coupling methods.

RFID tags may be incorporated into or attached to articles that a user wishes to later identify and/or track. In some cases, the tag may be attached to the outside of the article with a clip, adhesive, tape, or other means and, in other cases, the RFID tag may be inserted within the article, such as being included in the packaging, located within the container of the article, or sewn into a garment. Further, RFID tags are manufactured with a unique identification number which is typically a simple serial number of a few bytes with a check digit attached. This identification number is typically incorporated into the RFID tag during its manufacture. The user cannot alter this serial/identification number, and manufacturers guarantee that each RFID tag serial number is used only once and is, therefore, unique. Such read-only RFID tags typically are permanently attached to an article to be identified and/or tracked and, once attached, the serial number of the tag is associated with its host article in a computer database.

Frequently, a number of retail and other items are metallic in some form, which may cause issues with some known RFID tags. Additionally, a number of retail products, other items, and their associated packaging have non-planar surfaces that are not ideal for receiving some known RFID tags. For example, some RFID tag antennas are not suited for use on a curved portion of a bottle. Therefore, there also exists in the art a long felt need for improved systems and methods that can provide greater flexibility in RFID tag formation and/or placement.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

In some embodiments, a reactive RFID strap component comprising a RFID chip or strap and a conductor component which are both secured to a plastic clip component. The reactive RFID strap component is then attached to a metallic item or object. If the size and shape of the metallic item is suitable, the reactive RFID strap component can induce a far field antenna response, wherein coupling can be between electric fields, magnetic fields, or both with coupling related to the structure of the reactive RFID strap component and its proximity to the metallic item.

In some embodiments, the clip component of the reactive RFID strap component may be provided in multiple forms. For example, the tab of a clip component may comprise an edge that is aligned with an outside edge of a frame section. Alternatively, the tab of the clip component can be surrounded or encircled by the frame section on all edges or sides. Nonetheless, as explained more fully below, these two examples of possible types of clip components provide different mechanical properties. For example, the first example offered above is easier to fit and easier to position over an edge of a metallic item, but it is not as robust as the second example. On the other hand, while the second example of a possible clip style may be harder to attach to the metallic object, it is more robust than the first example and may have a longer useful life.

In some embodiments, the reactive RFID strap component can be secured to the clip component in multiple ways. For example, the conductor component can be formed in a conductive loop with the RFID chip in series, coupling primarily by the magnetic fields. Alternatively, the conductive component can be a generally U-shaped conductor on the frame which couples to a metallic item primarily by the electric fields. In a further alternative embodiment, the conductive component can be a conductive loop that is mounted on the frame and runs around or encircles the tab of the clip component.

In some embodiments, a method of manufacturing the reactive RFID strap component is also disclosed. The method generally comprises forming an antenna on the surface of a suitable material, such as plastic. A RFID chip or strap is then attached, and the clip component cut. The clip component may be retained in the web by a series of tabs or be positioned on a release liner and attached by an adhesive. The clip components are then formatted for use, such as by placing them in rolls, canisters, or bags. The clip components can also be modified to help secure the clip component to the metallic item by adding surface deflections, adhesive fixing points, or tabs designed to engage with an existing hole or opening in the metallic item package or object thereby forming a more secure connection between the clip component and the metallic item.

In some embodiments, a method of manufacturing a RFID tag on a surface of a non-planar object includes forming an antenna on the surface of the non-planar object, and positioning a reactive RFID strap on the surface of the non-planar object near the antenna to form the RFID tag. The reactive RFID strap is coupled to the antenna so that a far field antenna response may be induced, wherein coupling can be between electric fields, magnetic fields, or both.

In some embodiments, the reactive RFID strap may be positioned before the antenna is formed on the surface of the non-planar object. The antenna may be manufactured from a conductive liquid and may be either sprayed or printed onto the surface of the non-planar object by ink jet spraying or printing. Alternatively, the antenna may be manufactured from a metal foil and positioned on the surface of the non-planar object. Further, if the surface area of the non-planar object is overly complex (e.g., contoured) at the location where the RFID antenna is formed, the method may further comprise adding a physical connection between the RFID antenna and the reactive RFID tag.

In some embodiments, a method of manufacturing a RFID tag adapted for a non-planar object includes scanning a surface of the non-planar object and then selecting a suitable design for an RFID antenna at a chosen location on the surface of the non-planar object. A suitable design for a reactive RFID strap may then be selected along with a suitable position for positioning the reactive RFID strap relative to the non-planar object, and the RFID tag can then be formed on the surface of the on-planar object. More specifically, the RFID antenna may be formed on the surface of the non-planar object either before or after the reactive RFID strap is positioned on the surface. Additionally, a radio frequency (RF) performance may be measured to ensure proper performance of the RFID tag and for purposes of optimizing the design. The reactive RFID strap is coupled to the antenna so that a far field antenna response is induced, wherein coupling can be between electric fields, magnetic fields, or both.

In some embodiments, a method of manufacturing a RFID tag adapted for a non-planar object includes first depositing a separator on a surface of a non-planar object. An antenna may then be formed on the separator, and a reactive RFID strap may be positioned on the separator so that the reactive RFID strap couples with the antenna to form the RFID tag. The reactive RFID strap is coupled to the antenna so that a far field antenna response is induced, wherein coupling can be between electric fields, magnetic fields, or both. The separator may be measured for thickness, and the separator thickness adapted to ensure stability of the RFID tag. The separator may further comprise a ramped portion so that the antenna may be formed on the separator, down the ramped portion, and into contact with the surface of the non-planar object. Alternatively, a base conductor may be first positioned on the surface of the non-planar object, and the separator may be deposited or positioned atop the base conductor.

In some embodiments, a method of manufacturing a radio frequency identification (RFID) tag on a target surface of a non-planar object may be provided. The method may include positioning an antenna on the target surface of the non-planar object, positioning a reactive RFID strap on the target surface, and coupling the reactive RFID strap to the antenna to induce an antenna response.

The target surface may be at least one of coupled to or part of a container. The container may be one of a bag, a box, a bottle, or a can. The reactive RFID strap may be positioned on the target surface prior to positioning the antenna. The reactive RFID strap may be coupled to the antenna via an electric field. The reactive RFID strap may be coupled to the antenna via a magnetic field. The reactive RFID strap may be coupled to the antenna via both an electric field and a magnetic field.

The reactive RFID strap may be physically coupled to the antenna. The antenna may be sprayed or printed on the target surface. The antenna may be formed from a conductive ink. The method may include scanning a target surface of the non-planar object, selecting a design for an antenna suitable for the target surface, and selecting a design of a reactive RFID strap based on one or more of the target surface and the selected antenna. The method may include choosing a position for attaching the reactive RFID strap to the surface based on the scanning. The method may include measuring a radio frequency (RF) performance of the RFID tag once it has been formed.

The method may include forming the target surface by depositing a separator layer on a target area of the non-planar object, the target surface being an external surface of the separator layer. A thickness of the separator layer may be adapted to improve stability of the RFID tag. The separator layer may be formed on a supporting surface of the non-planar object and may include a ramped portion. The antenna may be deposited onto the ramped portion and the supporting surface.

The method may include forming the target area by applying a base conductor to a supporting surface of the non-planar object. Positioning the reactive RFID strap on the target surface may include forming the reactive RFID strap. Positioning the antenna on the target surface may include forming the antenna.

In some embodiments, an RFID clip for coupling to a metal component of an item to form an RFID tag is provided. The RFID clip may include a clip substrate, and an RFID strap component comprising an RFID chip and a conductor component. When the clip substrate is attached to an item having a metal component, the RFID strap component may be configured to induce an antenna response in the metal component.

The conductor component may be formed as a loop that may be coupled to the RFID chip. The clip substrate may include a tab configured for engaging the item. The item may be one of a container, at least part of a vehicle, or at least part of an architectural structure.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 3A-E illustrates views of an RFID component with a metallic object in accordance with some embodiments.

FIG. 5A-D illustrate views of a reactive RFID strap component before and after being modified with surface deflections in accordance with various embodiments.

FIG. 6A-B illustrate a front views of reactive RFID strap components modified with additional adhesive fixing points in accordance with various embodiments.

DETAILED DESCRIPTION

Figure 1:
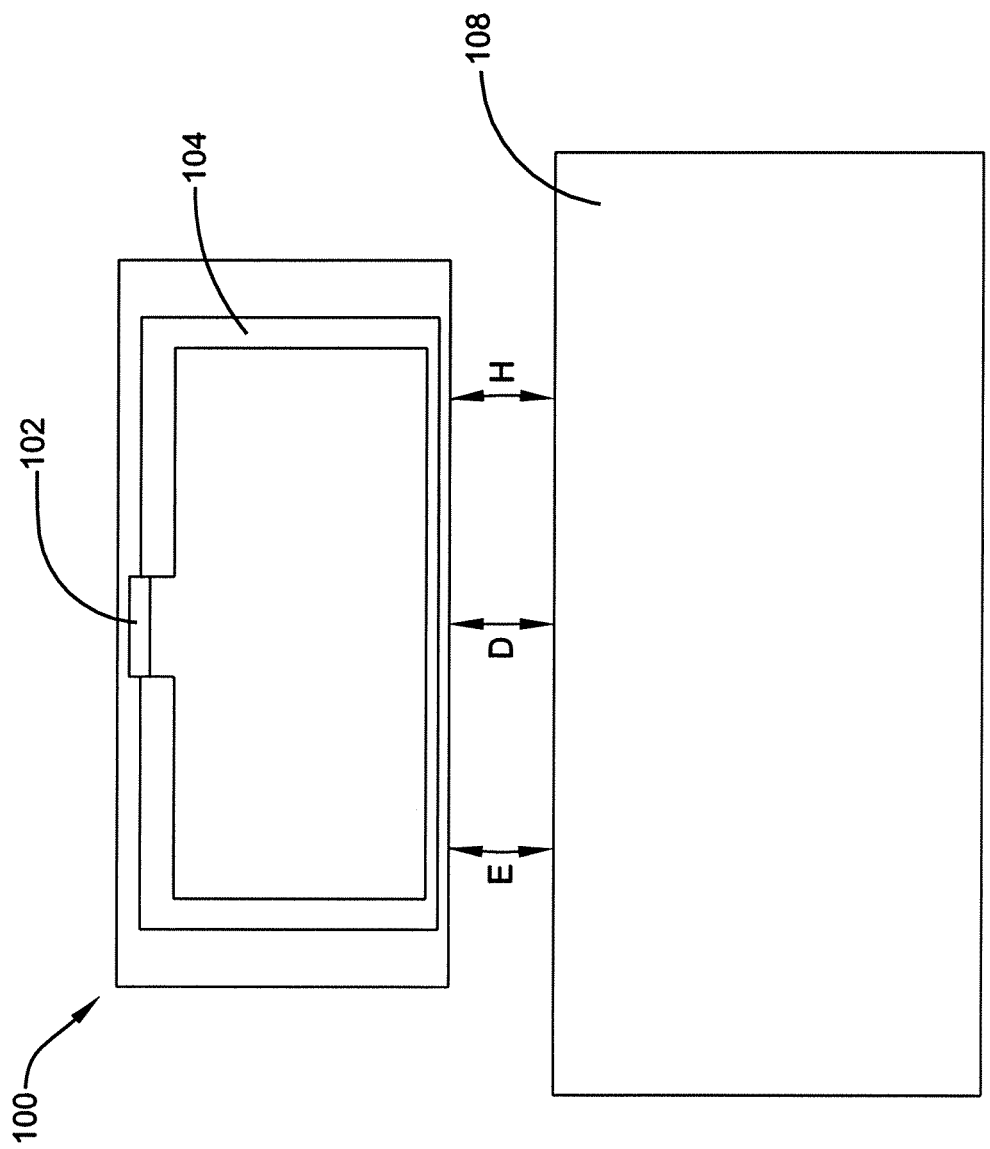
FIG. 1 illustrates a top view of a reactive RFID strap component in proximity to and coupled with a metallic object in accordance with some embodiments.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

In one embodiment, the present invention discloses a reactive RFID strap component comprising a RFID chip or strap and a conductor component which are both secured to a clip component, such as a clip component comprised of plastic or some other suitable material. The reactive RFID strap component is then attached to a metallic item or object. If the size and shape of the metallic item is suitable, the reactive RFID strap component may be capable of inducing a far field antenna response, wherein coupling can be between electric fields, magnetic fields, or both with the coupling related to the structure of the reactive RFID strap component and its proximity to the metallic item.

In another embodiment, the RFID chip and conductor component can be secured to the clip component in multiple ways. For example, the conductor component can be formed in a conductive loop with the RFID chip in series, with coupling primarily by the magnetic fields. Alternatively, the conductor component can be a generally U-shaped conductor on the frame which couples to a metallic item primarily by the electric fields. In a further alternative embodiment of the present invention, the conductor component can be a conductive loop that is mounted on the frame and encircles the tab of the clip component. Furthermore, the various alternative embodiments of the clip components can be modified to help secure the clip component to the metallic item by adding surface deflections, adhesive fixing points, or tabs designed to engage with an opening or plurality of openings already formed in the metallic item or package to provide a more secure attachment thereto. Furthermore, various methods of manufacturing a RFID tag comprising an antenna and a reactive RFID strap on a three dimensional (3D) or non-planar object are also disclosed.

Referring initially to the drawings, FIG. 1 illustrates a top view of a reactive RFID strap component 100 in proximity with and coupled to a metallic item 108 or other conductive object. The reactive RFID strap component 100 is typically a reactive strap which induces an antenna response into the metallic item 108, and is integrated into a plastic clip but can be any reactive object. Further, reactive RFID strap component 100 can be any suitable size, shape, and/or configuration in various embodiments. The shape, size and configuration of the reactive RFID strap component 100 shown in the various figures is for illustrative purposes only. Although the dimensions of the reactive RFID strap component 100 (i.e., length, width, and height) may be any shape, size or configuration that is useful and/or satisfies user need or preference.

Typically, the reactive RFID strap component 100 is comprised of a RFID chip or strap 102 and a conductor component 104 which are both secured to a clip component 106. The reactive RFID strap component 100 is then attached to a metallic item 108 or other suitable conductive object. If the size and shape of the metallic item 108 are sufficient, the reactive RFID strap component 100 can induce a far field antenna response. For example, coupling can be via electric fields (E), magnetic fields (H), or commonly, by both electric (E) and magnetic (H) fields with coupling being related to the structure of the reactive RFID strap component 100 and its proximity to the metallic item 108. Thus, coupling of the reactive RFID strap component 100 to the metallic item 108 in the electric (E) and magnetic (H) fields is somewhat dependent upon geometry.

The reactive RFID strap components 100 can be versatile, such that they can be altered depending on the needs and/or wants of a user. For example, the reactive RFID strap components 100 can be produced to be relatively flat so they can be used in a roll to roll process, or other suitable distribution process. Further, the reactive RFID strap components 100 may be designed to slip over the edges of metallic items 108 and could incorporate a stop such that they only transmit and/or move a certain distance. Additionally, the reactive RFID strap components 100 in their various possible alternative embodiments can comprise an adhesive with a release liner making the reactive RFID strap components 100 easy to attach to and remove from the metallic items 108. The profile of the strap component 100, or the amount of material that sticks up above the metallic item 108, can be varied as well, depending on the needs and/or wants of a user. Overall, the reactive RFID strap components 100 are produced to be quite robust or strong and easily applied to the metallic items 108.

Metallic items may include one or more of cans, bags comprising foil, packages with metal components or metal exteriors, packages having a metallic film coating and/or a foil coating, bottles with foil or otherwise metallic labels, or bags with foil or metallized interior or exterior surfaces, among other objects. Other metallic objects may include tools, electronic devices, vehicles, machine components being assembled during manufacturing, and building components such as beams, frames, brackets, and other structures.

Figure 2A:
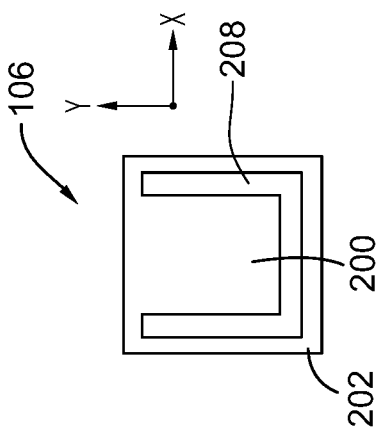
FIGS. 2A-D illustrate front views of the clip component in accordance with various embodiments.
Figure 2B:
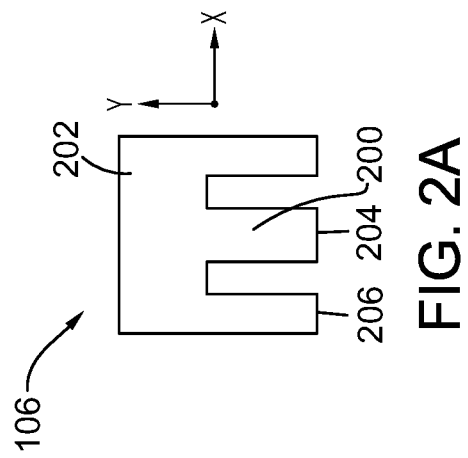

As shown in FIGS. 2A-B, the RFID chip 102 and the conductor component 104 may both be secured to a clip component 106. More specifically, FIG. 2A illustrates a front view of one possible embodiment of the clip component 106, and FIG. 2B illustrates a front view of an alternative embodiment of the clip component. In some embodiments, the clip component 106 is a plastic clip, but can also be made of glass, wood, paper, cardboard, carbon fiber, rubber, metal, or other materials. The shape, size and configuration of the clip component 106 shown in FIGS. 2A-B is for illustrative purposes only, and the clip component 106 may be any shape or size that is useful. Further, the clip component 106 can typically be utilized in two basic forms as shown, or other forms in various embodiments.

As shown in FIG. 2A, the clip component 106 comprises a tab component 200 and a frame component 202. The tab component 200 comprises an edge section 204 that is aligned with the outside edge section 206 of the frame component 202. As shown in FIG. 2B, the clip component 106 comprises the tab component 200 surrounded by the frame component 202 on all edges. Thus, the two different forms of clip components 106 comprise different mechanical properties. For example, the clip component 106 of FIG. 2A may be easier to fit to a metallic item 108, as at the end of the manufacturing process, the tab component 200 can be deflected and can easily be pushed over the aligned edge sections 204 and 206. However, the clip component 106 form of FIG. 2A may be less robust than that shown in FIG. 2B, depending on design and manufacturing processes. Conversely, while the form of clip component 106 of FIG. 2B may be more difficult to attach to a metallic item or object 108 compared to the form of clip component shown in FIG. 2A, the clip component form of FIG. 2B may be more robust than the clip component form disclosed in FIG. 2A and may have a longer useful life.

In some embodiments, such as in FIG. 2A, the tab component 204 and the outside edge sections 206 include prongs or flanges that are integrally formed with the frame component 202 at a first end and that extend downward along a Y-axis direction. The frame component 202 may have a height extending along the Y-axis and a width extending along the X-axis direction. Each of the tab component 204 and the outside edge sections 206 may have a length extending along the Y-axis direction and a width extending along the X-axis direction. In various embodiments, the length of one or more of the tab component 204 and the outside edge sections 206 may be between 0.2-0.5, 0.5-1.0, 1-2, 2-5, 5-10, or 10-50 times the height of the frame component 202. The lengths of the tab component 204 and the outside edge sections 206 may be the same, or may vary.

In some embodiments, such as in FIG. 2B, the ends of the outer edge sections 206 are connected by a part extending along the X-axis direction, defining an enclosed cut, gap, or opening 208 between the outer edges 206 and the tab component 204.

Figure 2C:
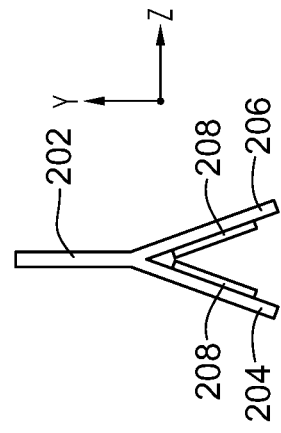
Figure 2D:
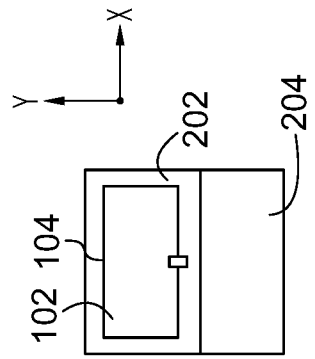

In some embodiments, such as in FIG. 2C, the width of the tab component 204 extends across the width of the frame component 202. In some embodiments, an outside edge section 206 is not attached to the frame component 202. In some embodiments, such as in FIG. 2D, the tab component 204 and the outside edge section 206 extend from the same edge of the frame component 202 and/or may share one or more edges with each other. In some embodiments, such as in FIG. 2D, one or both of the tab component 204 and the frame component 202 may include a deformable layer 210 which may be made of metal, plastic, wood, rubber, adhesive, or other materials, and which may assist with crimping, adhering, gripping, or otherwise attaching the frame component 202 to the metallic item 108.

In some embodiments, the clip may be attached to the metallic item 108 by extending part of the metallic item 108 (e.g., the edge of a foil bag) over the tab component 204 (e.g., in a Z-axis direction that extends perpendicularly to the XY-plane) and under the outer edge sections 206 (e.g., in a Z-axis direction). In other embodiments, the edge of the metallic item 108 may be extended under the tab component 204 and over the outer edge sections 206. One or more of the outer edges 206 and the tab component 204 may be elastically deflected and/or biased apart by the edge of the metallic item 108, and the resulting friction between the surfaces of the metallic item 108 and one or more of the tab component 204 and over the outer edge sections 206 may act to hold the frame component 202 to the metal item 108. For example, as shown in FIG. 3D, the frame component 202 may extend away from the metallic item 108, such as along a Y-axis direction, when the tab component 204 and/or one or more of the outer edge sections 206 are attached to the metallic item 108. In some embodiments, a deformable layer 210 may be added between the outer edge section 206 and the metallic item 108 and/or between the tab component 204 and the metallic item 108.

In other embodiments, the frame component 202 and/or one or more of the tab component 204 and over the outer edge sections 206 may be crimped, adhered, or otherwise attached onto the metallic item 108. In other embodiments, the frame component 202 may be attached to the metallic item 108 through one or more of adhesion, taping, lamination, stapling, clamping, pinning, bolting, screws, heat shrinking, or other methods of attachment. In some embodiments, such as in FIG. 3E, the metallic item 108 may be disposed between the frame component 202 and one or more of the tab component 204 and the outer edge sections 206 when the frame component 202 is attached to the metallic item 108. In some embodiments, a deformable layer 210 may be added between the frame component 202 and the metallic item 108 and/or between the tab component 204 and the metallic item 108.

In various embodiments, such as shown in FIGS. 3A-C, the RFID chip 102 and the conductor component 104 can both be secured to a clip component 106. The RFID chip 102 and the conductor component 104 can be secured to the clip component 106 in multiple ways depending on the wants and/or needs of a user such as, for example, with adhesives. Further, the conductor component 104 can be any suitable size, shape, and/or configuration in various embodiments. The shape, size and configuration of the conductor component 104 shown in FIGS. 3A-C is for illustrative purposes only. Although the dimensions of the conductor component 104 (i.e., length, width, and height) are important design parameters for good performance, the conductor component 104 may be any shape or size that is useful and that satisfies user need.

Further, the conductor component 104 can typically be fitted to the clip component 106, for example, in the ways illustrated in FIGS. 3A-C. However, the conductor component 104 can also be fitted to the clip component 106 in any other suitable way. As shown in FIG. 3A, the conductor component 104 can be positioned in a conductive loop with the RFID chip 102 in series, thus coupling primarily in the magnetic (H) fields and positioned on the tab component 200. Alternatively, as shown in FIG. 3B, the conductor component 104 can be formed as a U-shaped conductor on the frame component 202, which couples to the metallic item 108 primarily by electric (E) field coupling. In a further alternative embodiment shown in FIG. 3C, the conductor component 104 may be positioned in a conductive loop with the RFID chip 102 in series and mounted on the frame component 202 such that the conductor component 104 encircles the tab component 200.

Figure 4:
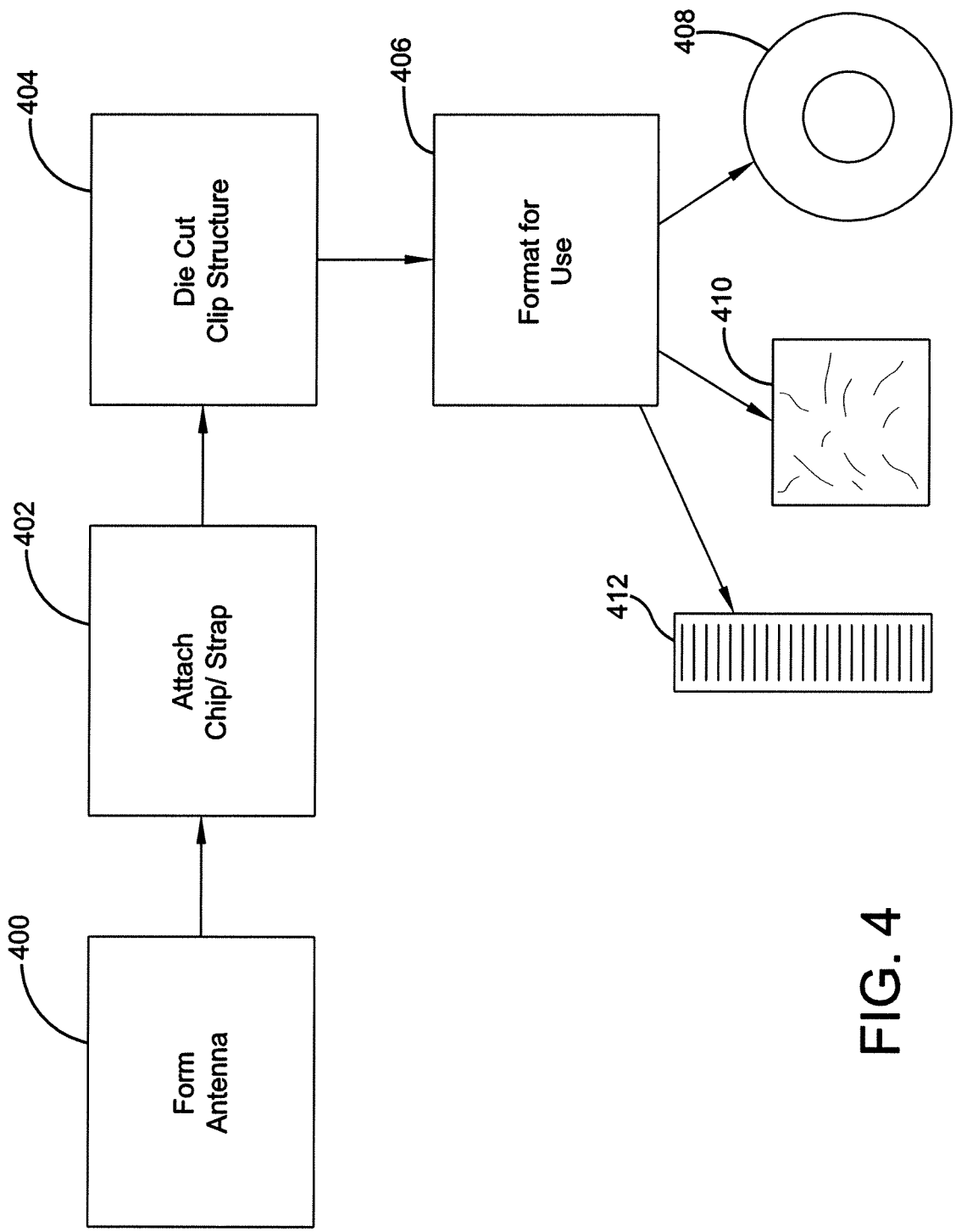
FIG. 4 illustrates a flowchart for manufacturing a reactive RFID strap component in accordance with some embodiments.

FIG. 4 illustrates a flowchart for manufacturing a reactive RFID strap component 100 for use with a metallic item 108. At 400, the method comprises forming an antenna on the surface of a suitable material, such as plastic (e.g., polyethylene terephthalate (PET)). Ideally, the material is thick enough to be self-supporting as a clip component, but thin enough to be processed roll to roll. Example thicknesses may be between 0.1-0.3 mm, 0.3-0.7 mm, 0.7-1.0 mm, 1-3 mm, 3-5 mm or any other suitable thickness. Alternatively, a thick card or corrugated material may be used, if the roll to roll process is not used. In some embodiments, the antenna may be formed via pattern printing an adhesive, laminating the foil, cutting around the pattern, and stripping the matrix.

At 402, a RFID chip or strap is then attached to the antenna, and at 404 the clip component may be die cut such that a user can cut around the critical structural elements. The clip component may be retained in the web by a series of tabs or be positioned on a release liner and attached by an adhesive. At 406, the clip components may then be formatted for use, such as by placing the clip components in rolls, canisters, or bags. For example, at 408, the clip components can be formatted in rolls, the rolls are then used in a printer and dispensed into a product. At 410, the clip components may be cut into single units and dropped into a bag for manual assembly. At 412, the clip components may be stacked into a tube or canister for use with an applicator gun.

In some embodiments, such as shown in FIGS. 5A-D, the reactive RFID strap component 100 may be modified via tools that apply heat and/or pressure to create deflections 500. Other suitable tools for making deflections 500 may also be used, such as punches. FIGS. 5A-B illustrate front and side views of the reactive RFID strap component 100 before being shaped by the heat and/or pressure tool, or an alternative tool, to create deflections 500.

FIGS. 5C-D illustrate front and side views of the reactive RFID strap component 100 post-deflection creating process, such as after being shaped by a tool that uses heat and/or pressure or other means to form deflections 500. The deflections 500 can either be 3D raised bump structures 502 or lowered bump structures 504 on the surface of the reactive RFID strap component 100. The deflections 500 comprise surface bumps or catches which may help to attach the clip component 106 to the conductor component 104 in a secure manner.

As shown in FIGS. 6A-B, the reactive RFID strap component 100 can further comprise additional grip 600 or adhesive fixing points 602 to better secure the clip component 106, such as to the metallic item 108. More specifically, FIG. 6A illustrates a front view of an embodiment of the reactive RFID strap component 100 modified with additional adhesive grips 600 and/or adhesive fixing points 602, and FIG. 6B illustrates a front view of an alternative embodiment of the reactive RFID strap component 100 modified with additional grips 600 and/or adhesive fixing points 602. Additional grips 600 and/or adhesive fixing points 602 may be added by printing or any other suitable form of dispensing. The grip 600 and adhesive fixing points 602 are typically added to the surface of the reactive RFID strap component 100, but may also be added to any other suitable area.

Figure 7C:
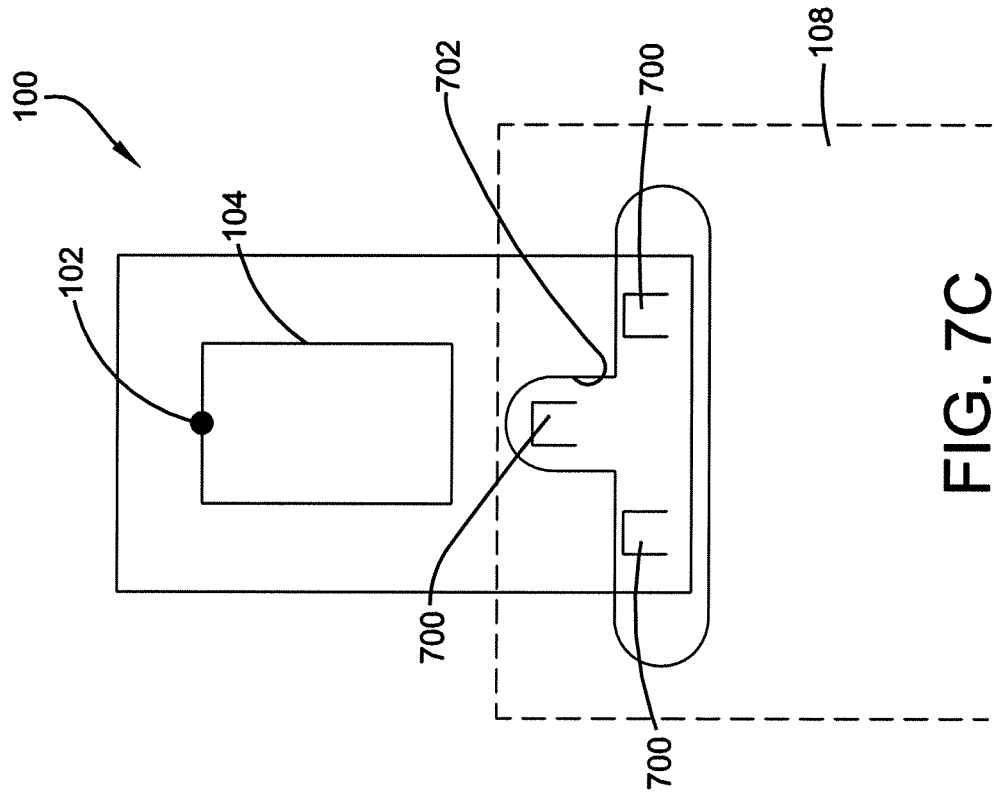
FIG. 7A-C illustrates views of a reactive RFID strap component with tabs in accordance with some embodiments.
Figure 7A:
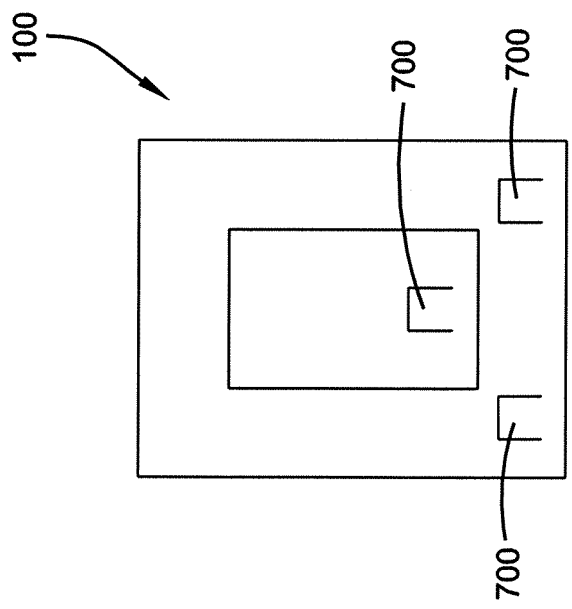
Figure 7B:
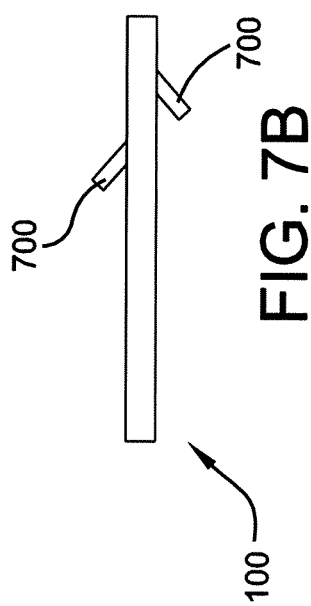

Additionally, as shown in FIGS. 7A-C, the reactive RFID strap component 100 may further comprise a plurality of tabs 700 formed on its surface. As shown in FIG. 7A, any number of tabs 700 can be used depending on the wants and/or needs of a particular user. Specifically, the tabs 700 can be non-return flaps that are pushed out of the reactive RFID strap component 100 (see FIG. 7B). As shown in FIG. 7C, the tabs 700 engage the metallic item 108. Typically, the tabs 700 engage a hole or opening 702 positioned in the metallic item 108, or any other suitable area of the metallic item 108. The hole or opening 702 is typically the opening already formed in the metallic item or object 108 and that is used for hanging the item 108 on a display rail or hook.

Figure 8:
FIG. 8 illustrates a top view of the reactive RFID strap component secured to a metallic bag in accordance with some embodiments.
Figure 9:
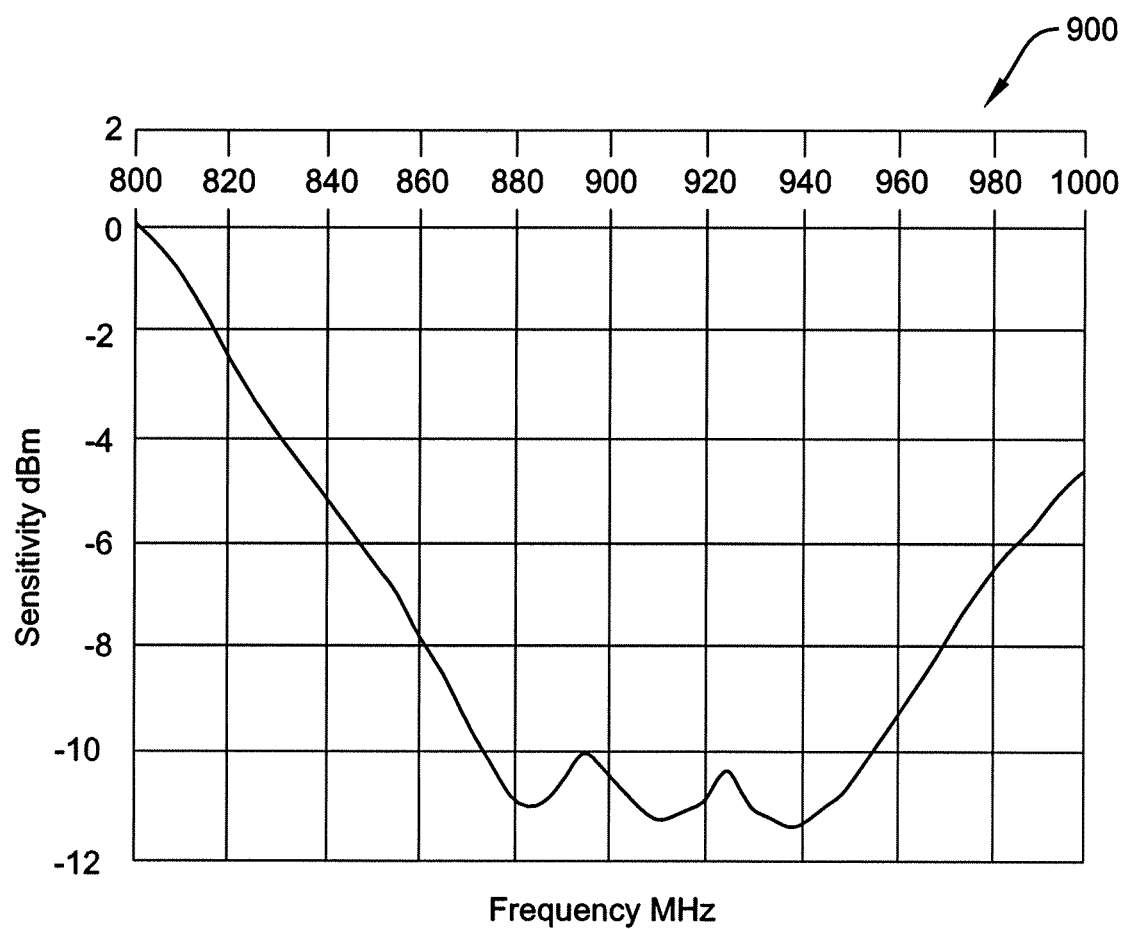
FIG. 9 illustrates a graph of the far field response in accordance with some embodiments.

As shown in FIG. 8, the reactive RFID strap component 100 may be secured to a metallic bag 800 to induce a far field antenna response, wherein coupling can be between electric fields, magnetic fields, or both. Further, FIG. 9 illustrates a graph of the far field response in accordance with some embodiments, and which illustrates an approximate −11 dBm sensitivity over the FCC band.

Figure 10:
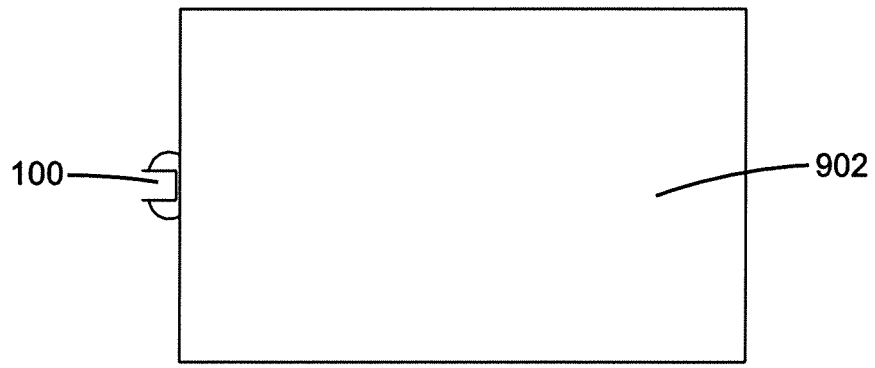
FIG. 10 illustrates a top view of the reactive RFID strap component secured to a metallic box in accordance with some embodiments.
Figure 11:
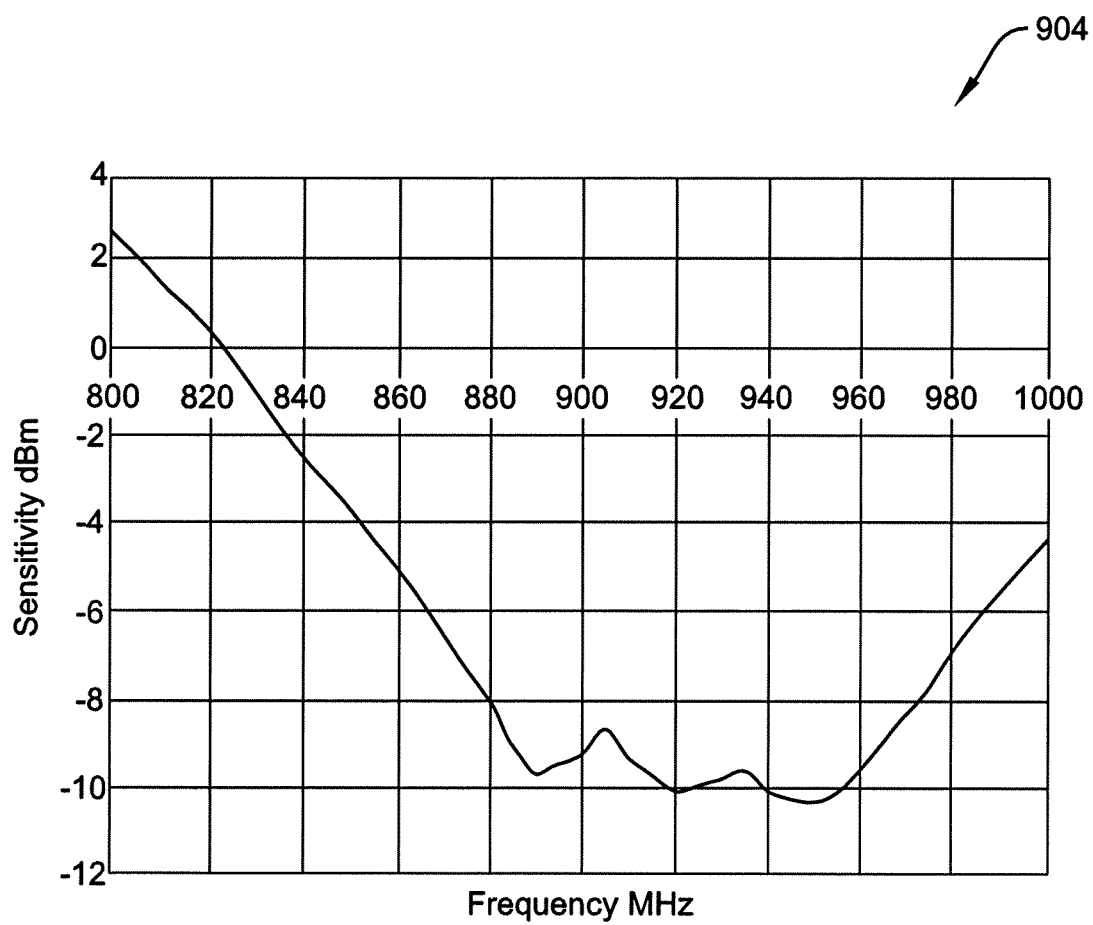
FIG. 11 illustrates a graph of the far field response in accordance with some embodiments.

As shown in FIG. 10, the reactive RFID strap component 100 may also be secured to a metallic box 902 to induce a far field antenna response, wherein coupling can be between electric fields, magnetic fields, or both. Further, FIG. 11 illustrates a graph of the far field response in accordance with some embodiments, and which illustrates an approximate −10 dBm sensitivity over the FCC band.

Figure 12:
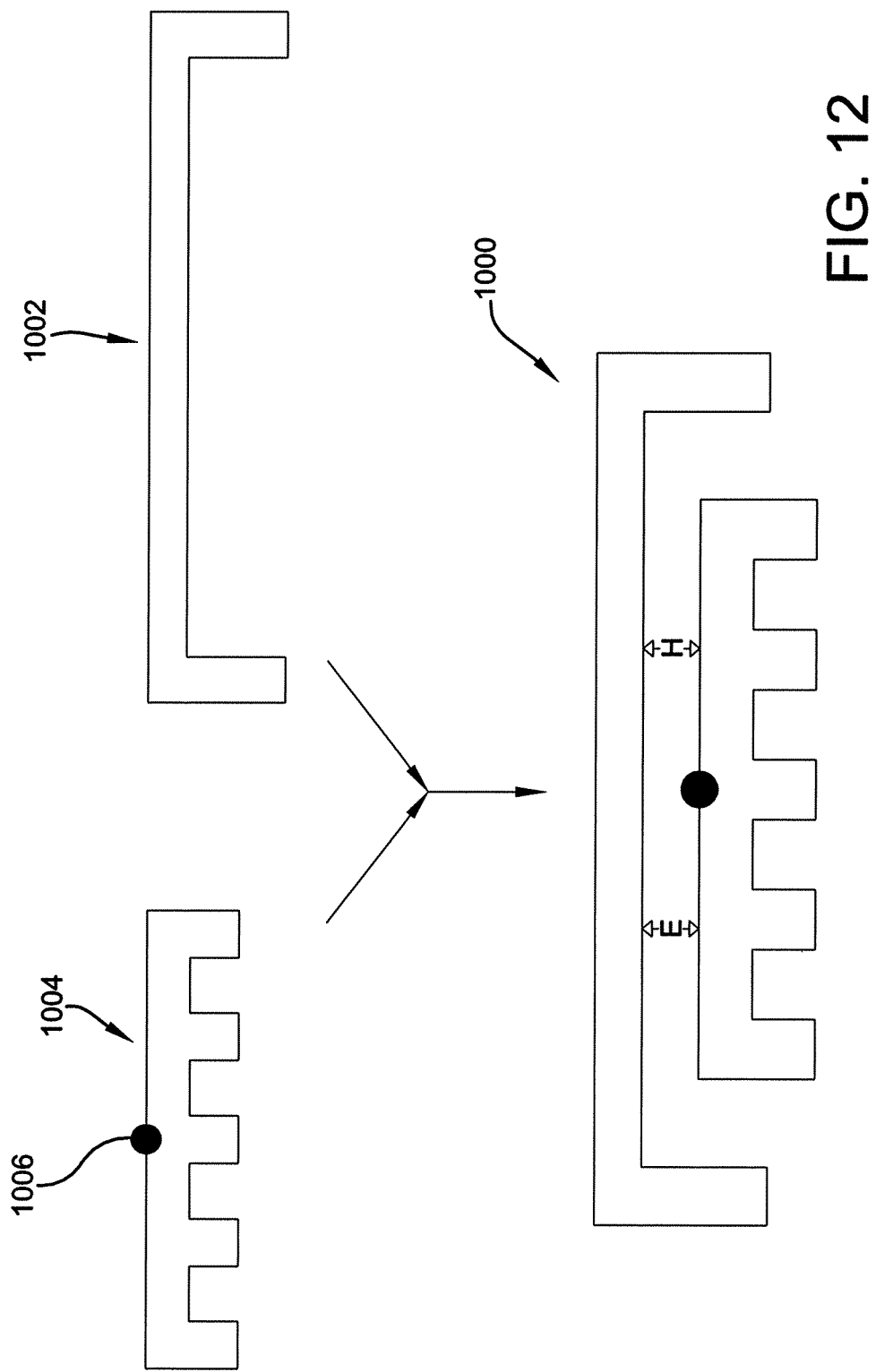
FIGS. 12-13 illustrates assembly of a reactive RFID strap and an antenna to form an RFID tag in accordance with various embodiments.
Figure 13:
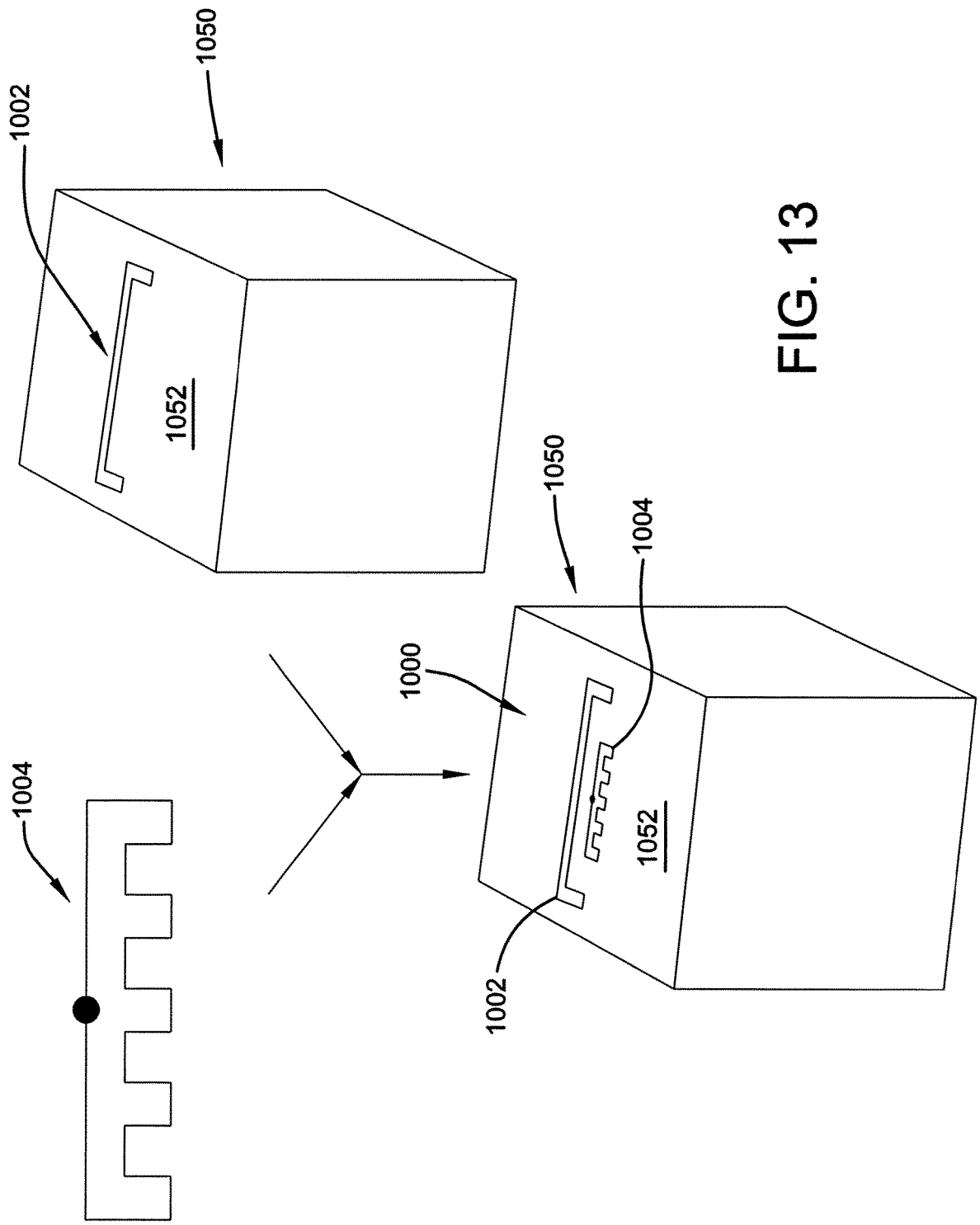
Figure 14:
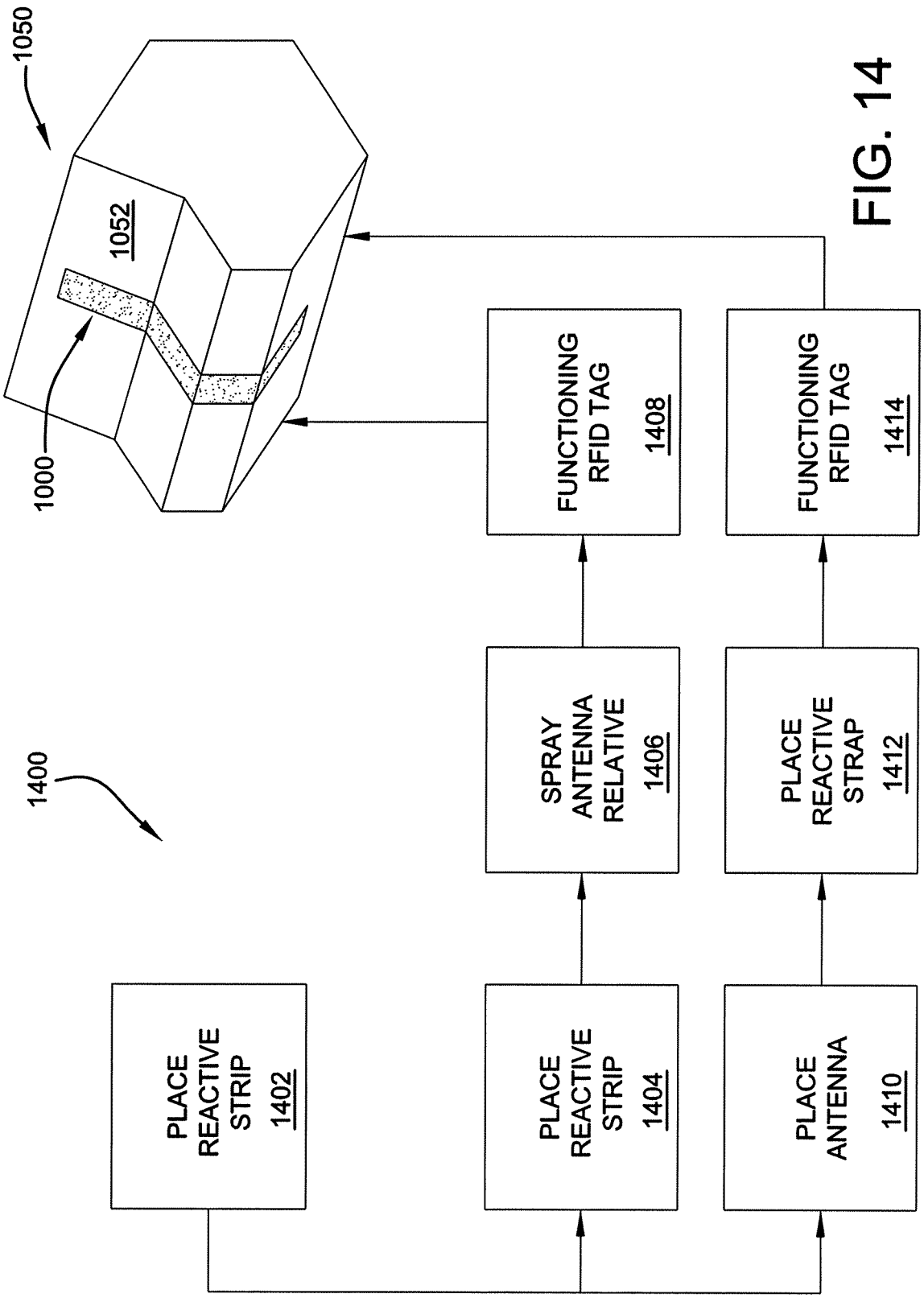
FIG. 14 illustrates a flowchart for assembling an RFID tag on the surface of an object in accordance with some embodiments.

FIGS. 12-14 illustrate methods for forming an RFID tag 1000, such as on a surface 1052 of a non-planar object 1050. The RFID tag 1000 may include an antenna 1002 and a reactive RFID strap 1004. The reactive RFID strap 1004 may further include an RFID chip 1006. The shape, size and configuration of both the antenna 1002 and the reactive RFID strap 1004 shown in the various figures are for illustrative purposes. Although the dimensions of both the antenna 1002 and the reactive RFID strap 1004 (i.e., length, width, and height) are important design parameters for good performance, both the antenna 1002 and the reactive RFID strap 1004 may be any shape, size or configuration that is useful and satisfies a user need and/or preference.

Typically, the RFID tag 1000 can induce a far field antenna response. For example, coupling of the antenna 1002 to the reactive RFID strap 1004 can be via one or both of electric fields (E) and magnetic fields (H), with coupling being related to the structure of the RFID tag 1000. Therefore, coupling of the antenna 1002 to the reactive RFID strap 1004 in the electric (E) and magnetic (H) fields is somewhat dependent upon geometry. The antenna 1002 is conductive and is typically formed from a variety of conductive materials that may include but are not limited to: metal foils (e.g., cut mechanically or by a laser), printed conductive inks, or vapor deposited materials. Furthermore, the RFID tag 100 may be formed by positioning the antenna 1002 near the reactive RFID strap 1004.

The generally non-planar object 1050 may be a box, bag, bottle, irregularly shaped product, or any other three dimensional object. The RFID tag 1000 may be formed on the surface of a product itself, or on its primary or secondary packaging as desired, any of which may serve as the non-planar object 1050. The non-planar object 1050 and/or the surface 1052 may be composed of one or more of paper, plastic, cardboard, wood, plywood, metal, glass, ceramic, rubber, adhesive, or other materials.

FIG. 14 illustrates a method 1400 of manufacturing the RFID tag 1000 on the surface 1052 of the non-planar object 1050. The method begins at 1402 where the non-planar object 1050 for receiving the RFID tag 1000 is selected. The construction of the RFID tag 1000 may begin by forming the antenna 1002 on the surface 1052 of the non-planar object 1050 at operation 1410. At operation 1412, the reactive RFID strap 1004 is then positioned on the surface 1052 of the non-planar object 1050. The reactive RFID strap 1004 is then coupled to the antenna 1002 to induce a far field antenna response as a functioning RFID tag 1000 at operation 1414. The surface 1052 of the non-planar object 1050 may be non-conductive or conductive.

Alternatively, and as also illustrated in FIG. 14, the method 1400 may begin at operation 1402 wherein the non-planar object 1050 for receiving the RFID tag 1000 is selected. At operation 1404, the construction of the RFID tag 1000 may begin by forming and positioning the reactive RFID strap 1004 on the surface 1052 of the non-planar object 1050, prior to forming the antenna 1002. Then, at operation 1406, the antenna 1002 may be formed on the surface 1052 of the non-planar object 1050, and the reactive RFID strap 1004 may be coupled to the antenna 1002 to induce a far field antenna response as a functioning RFID tag 1000 at operation 1408. More specifically, the coupling of the antenna 1002 to the reactive RFID strap 1004 can be via electric fields (E), magnetic fields (H), or by both electric (E) and magnetic (H) fields. Additionally, the reactive RFID strap 1004 may be physically coupled to the antenna 1002 if so desired.

The antenna 1002 may be deposited onto the non-planar object 1050 by spraying or printing a conductive ink to form the antenna 1002. The ability to choose between spraying or printing to deposit a conductor onto a non-planar object, where an antenna shape may be adapted to function optimally, provides the manufacturer or other user with greater design flexibility and choice relative to the location on the non-planar object 1050 where an RFID tag may be formed. For example, on a bottle, some methods include trying to form an RFID tag antenna on a flat surface on either the base or a top of the bottle. However, by using the methods 1400 depicted in FIG. 14, a user may form the antenna 1002 on any portion of the bottle surface, and adapt the same to the shape or contour of the bottle, so that in conjunction with the reactive RFID strap 1004 that is flexible enough to conform to the surface 1052, a high performance RFID tag 1000 may be created. If the reactive RFID strap 1004 is not adequately flexible or otherwise structured to attach to a particular surface where the antenna 1002 is formed, the reactive RFID strap 1004 may be placed on a relatively flat area and the antenna 1002 may be sprayed to create a physical connection between the antenna 1002 and the reactive RFID strap 1004, thereby forming the final RFID tag 1000. For example, the particular surface may include a highly complex three dimensional surface area and/or may include features that make attachment and/or printing more difficult. For example, rough surfaces such as gravel, or sandpaper may be more challenging to attach to. Features such as corners, spikes, holes, sharp edges, may also make attachment more challenging.

Figure 15:
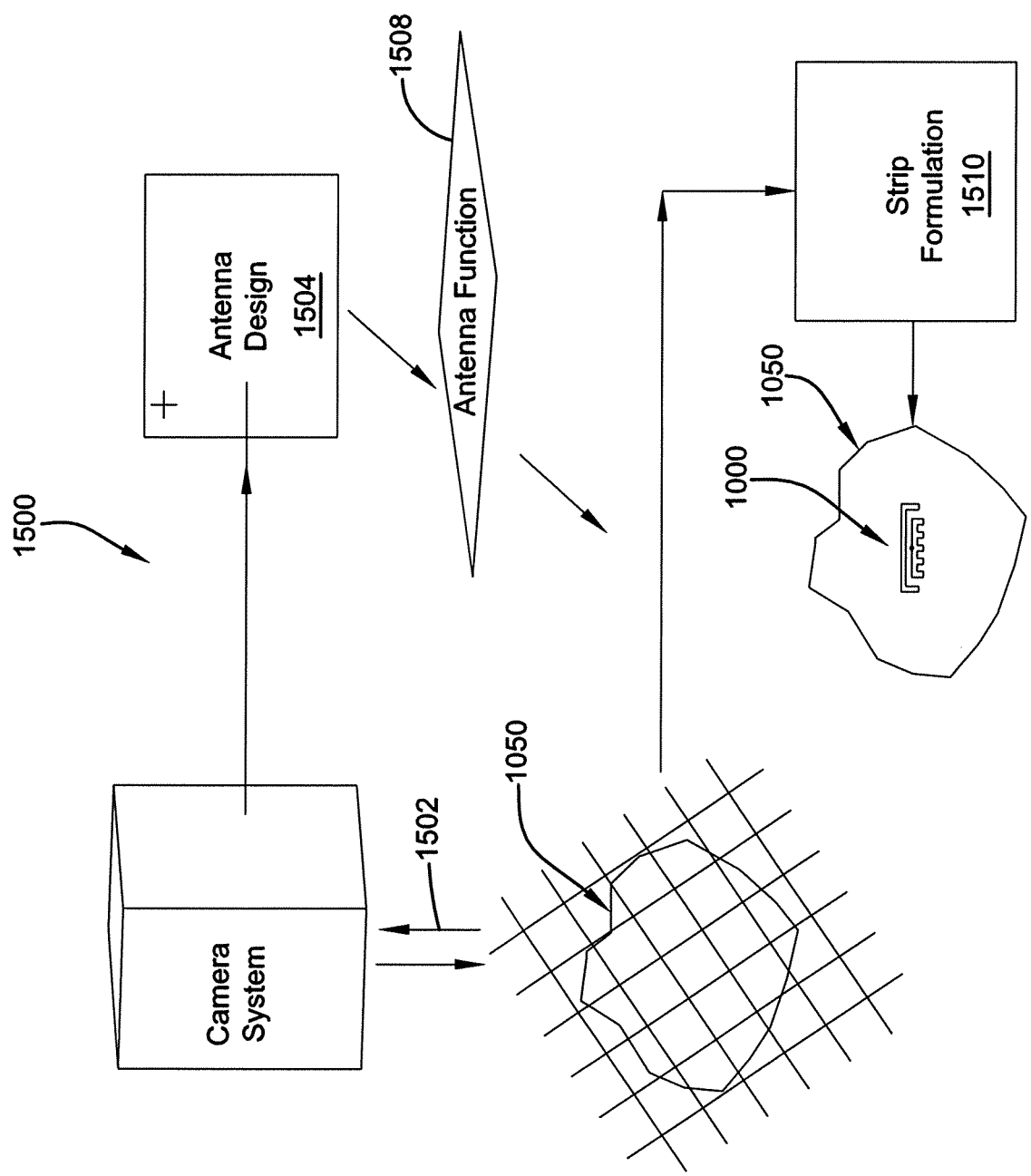
FIG. 15 illustrates a flowchart for scanning a surface of a non-planar object and assembling an RFID tag on the surface of an object in accordance with some embodiments.
Figure 16:
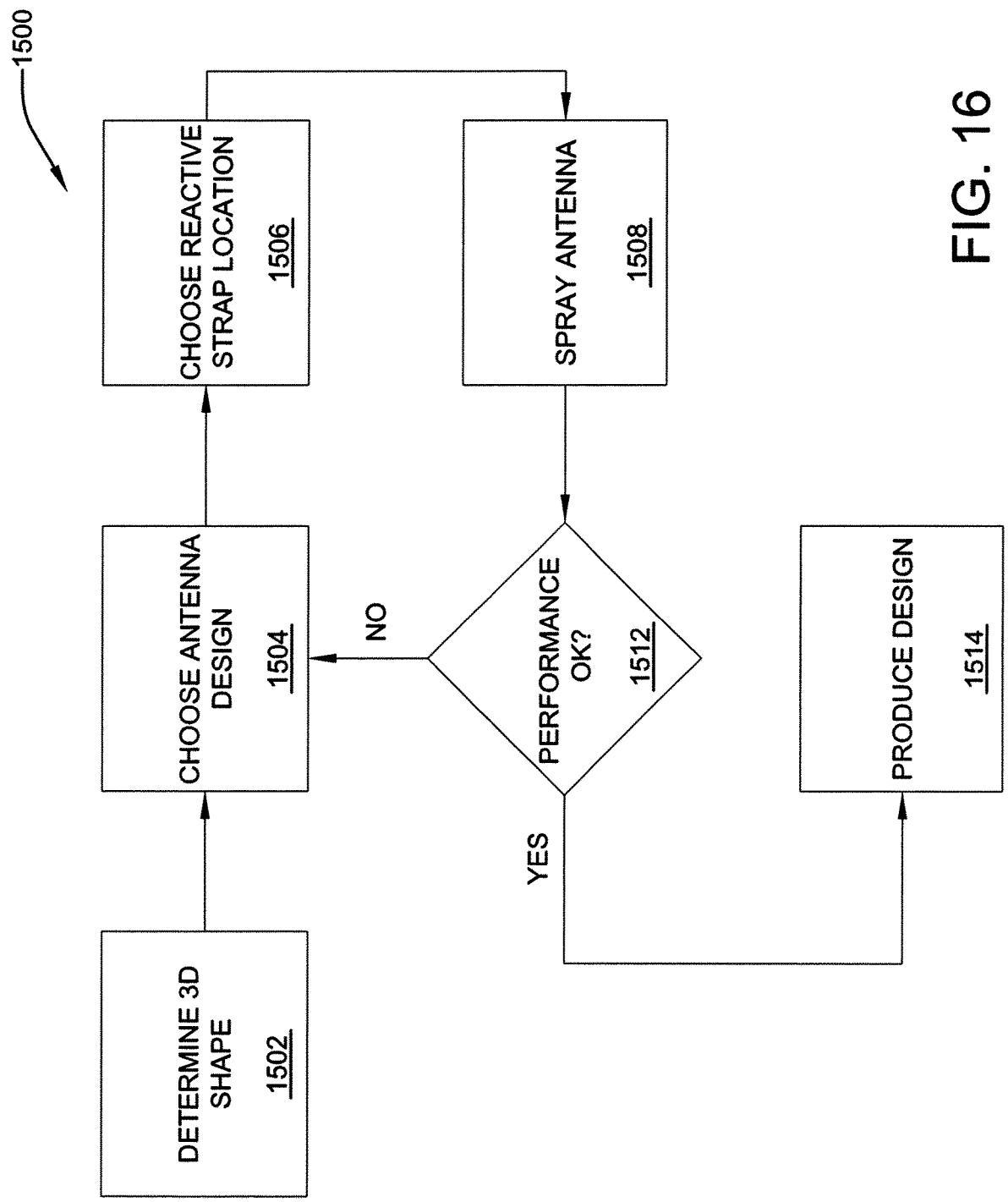
FIGS. 16-19 illustrates multiple different flowcharts for manufacturing the RFID tag on the surface of an object in accordance with various embodiments.

FIGS. 15 and 16 illustrate a method 1500 of manufacturing a RFID tag 1000 adapted for a surface 1052 of a non-planar object 1050 based on the object shape and/or composition. More specifically, the method 1500 utilizes a camera system and a laser grid or the like to precisely scan the non-planar object 1050 onto which the antenna will be formed to correctly create the antenna, as there may be variations in the non-planar object 1050 and/or its placement on a production line. As with the prior methods 1400 depicted in FIG. 14, the reactive RFID strap 1004 may be placed on the surface 1052 of the non-planar object 1050 before or after creation of the antenna 1002 to form the high performance RFID tag 1000.

In some embodiments, the method 1500 begins at operation 1502 by determining the three dimensional position and shape of the non-planar object 1050 as the camera system scans the surface 1052. At operation 1504, a design for an antenna 1002 suitable for a chosen location along the surface 1052 of the non-planar object 1050 is selected, compensating for surface shape and position. A design of a reactive RFID strap 1004 and a position for attaching the reactive RFID strap 1004 to the surface 1052 of the non-planar object 1050 is chosen at operation 1506. At operations 1508 and 1510, the antenna 1002 is then sprayed or created onto the surface 1052 of the non-planar object 1050, and coupled to the reactive RFID strap 1004 to form the RFID tag 1000 on the surface 1052 of the non-planar object 1050 to produce a far field antenna response. At operation 1512, a measurement of RF performance is conducted, either inline or offline. If the RF performance is acceptable at operation 1512, the method ends at operation 1514 with the design having been successfully produced. If, on the other hand, the performance is not acceptable, the method of manufacture returns to operation 1504 and the antenna design is adapted to optimize performance.

In some embodiments, the reactive RFID strap 1004 may be positioned on the surface 1052 of the non-planar object 1050 before creation of the antenna 1002. Additionally, the antenna 1002 may also be printed or otherwise positioned on the surface 1052 of the non-planar object 1050. The coupling of the antenna 1002 to the reactive RFID strap 1004 can be via electric fields (E), magnetic fields (H), or by both electric (E) and magnetic (H) fields. Additionally, the reactive RFID strap 1004 may be physically coupled to the antenna 1002 if desired.

Figure 17:
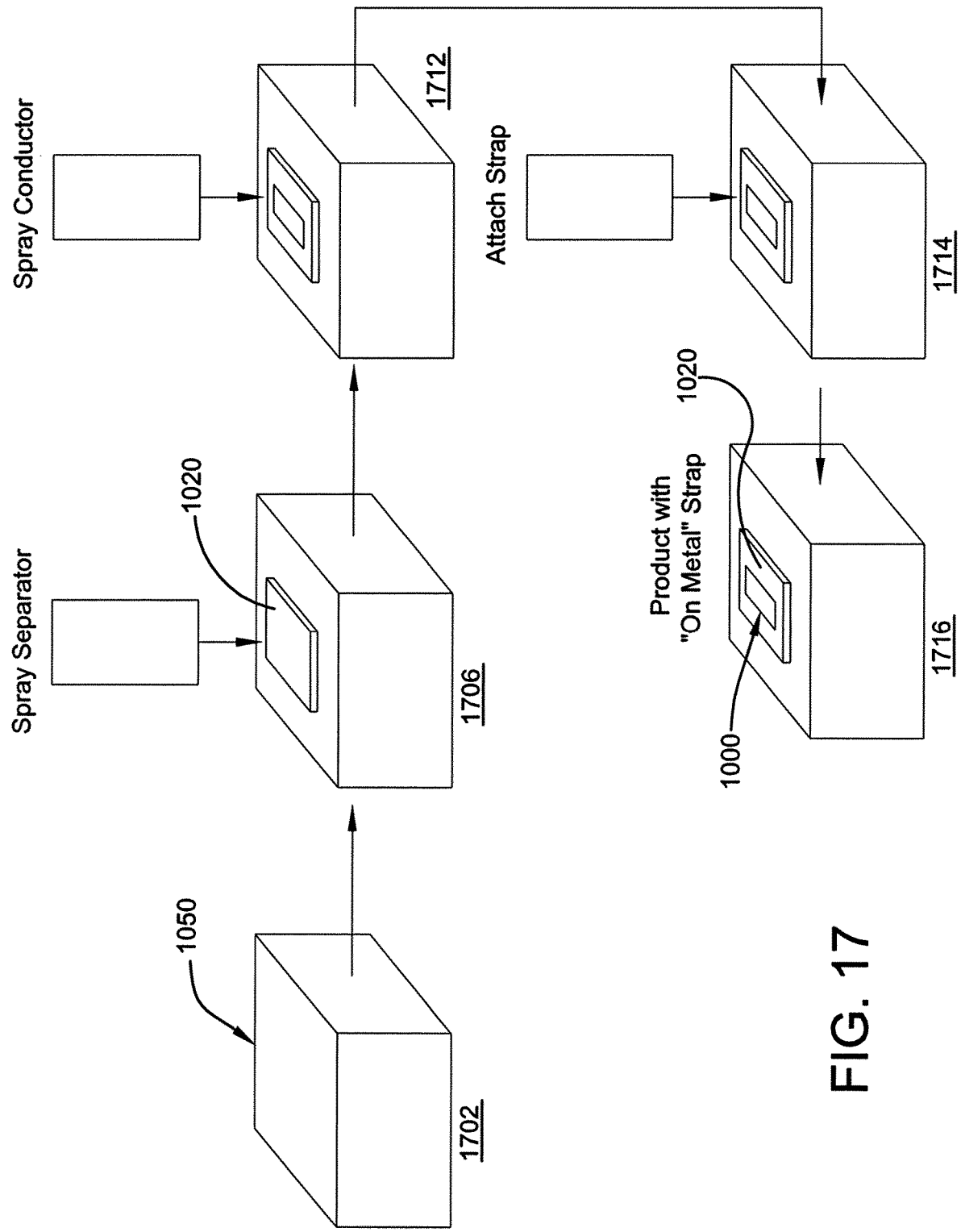

FIGS. 17-20B illustrate various methods of manufacturing a RFID tag 1000 adapted for a non-planar object 1050. The methods may be adapted for creating a RFID tag 1000 comprising more than one layer, which can be advantageous as metal and liquid objects can cause a significant drop in the performance of a standard RFID tag. As such, an RFID tag design utilizing an antenna formed on a separating material, such as a foam plastic or similar material with a high dielectric constant, for example, a flexible plastic with a ceramic dielectric powder such as, titanium dioxide or a barium titanate may be used. FIG. 17 illustrates method wherein the RFID tag 1000 is formed on the non-planar object 1050 by first depositing a separator 1020, then an antenna 1002, and a reactive RFID strap 1004 to form a "surface insensitive" RFID tag 1000.

In some embodiments, a method of manufacturing a RFID tag 1000 adapted for a non-planar object 1050 begins at operation 1702, wherein the non-planar object 1050 for receiving the RFID tag 1000 is selected. At operation 1706, the construction of the RFID tag 1000 begins with the separator 1020 being deposited onto the non-planar object 1050, for example, by spraying. Next, at operation 1712, an antenna 1002 is formed on the separator 1020. As previously stated, the antenna 1002 may be sprayed, printed, or otherwise positioned atop the separator 1020. At operation 1714, a reactive RFID strap 1004 is attached to the separator 1020, and coupled to the antenna 1002 to create the RFID tag 1000 with a far field antenna response at operation 1716. Alternatively, the reactive RFID strap 1004 may be positioned on the separator 1020 before creation of the RFID antenna 1002. The coupling of the antenna 1002 to the reactive RFID strap 1004 can be via electric fields (E), magnetic fields (H), or by both electric (E) and magnetic (H) fields. Additionally, the reactive RFID strap 1004 may be physically coupled to the RFID antenna 1002 if desired.

Figure 18:
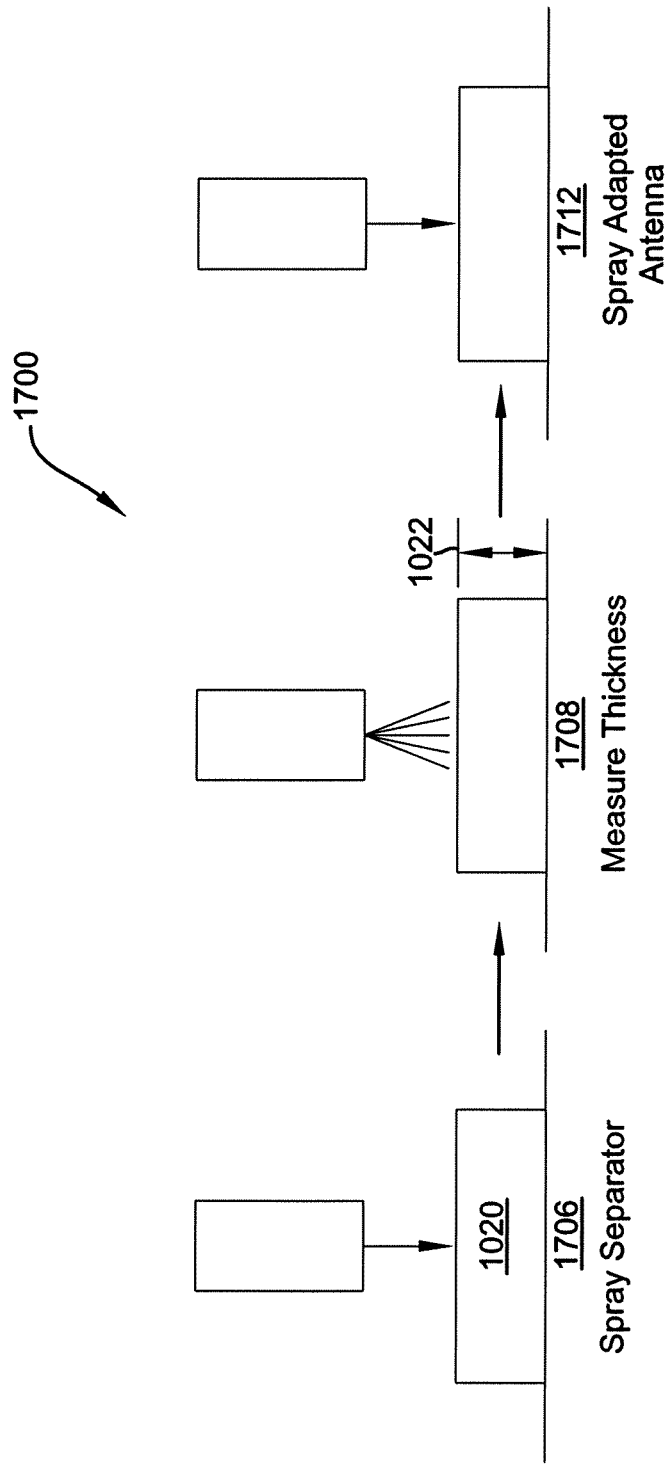

In some embodiments, such as in FIG. 18, the antenna shape and reactive RFID strap location are adapted to a thickness measurement 1022 of the separator 1020. More specifically, after the separator 1020 is deposited onto the surface of the non-planar object 1050 at operation 1706, the thickness 1022 of the separator 1020 is measured at operation 1708. At operation 1712, the antenna 1002 may be sprayed, printed, or otherwise positioned atop the separator 1020. At operation 1714, a reactive RFID strap 1004 is attached to the separator 1020, and coupled to the antenna 1002 to create the RFID tag 1000 with a far field antenna response at operation 1716 as before. The separator 1020 does not need to be applied to a larger area of the non-planar object 1050 than the area required for the RFID tag 1000. For example, the separator 1020 may be created only directly underneath the RFID tag 1000, thereby blocking less of a surface 1052 of the non-planar object 1050 to avoid obscuring other desirable qualities such as branding or marking.

Figure 19:
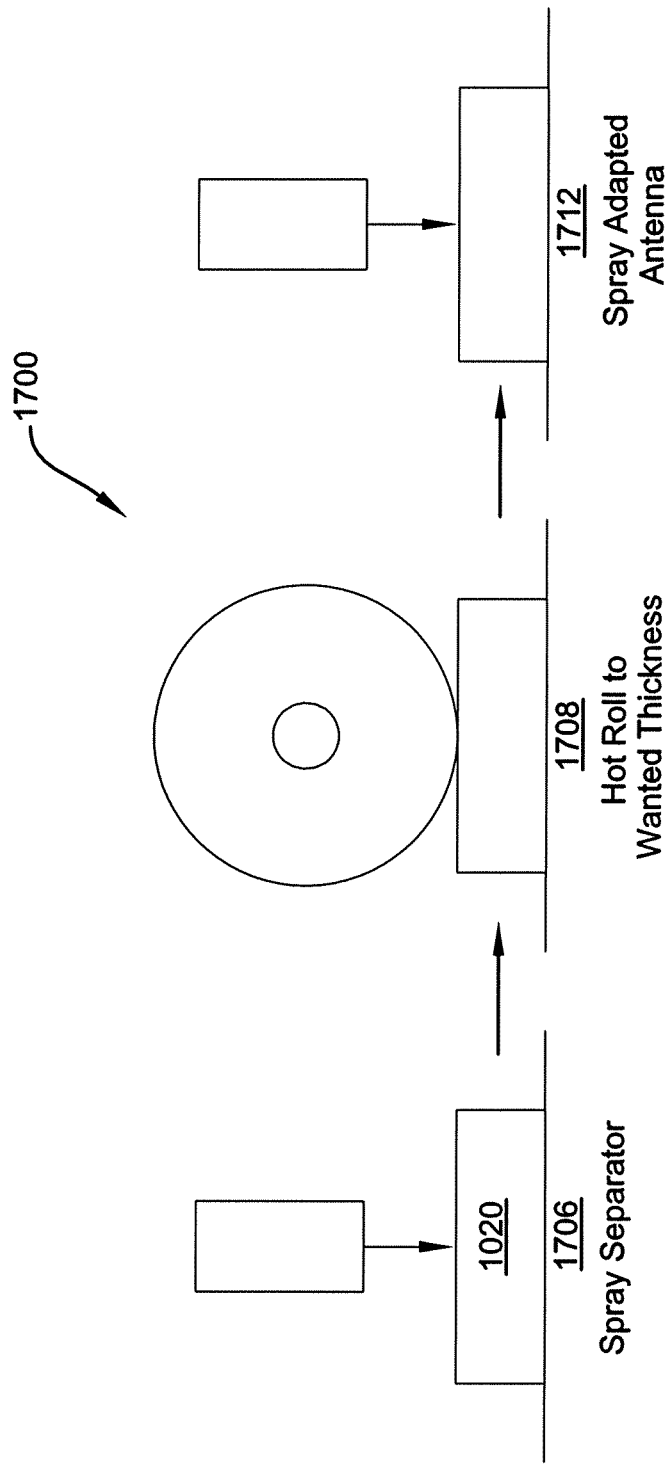

In some embodiments, such as in FIG. 19, the accuracy of the initially applied material for the separator 1020 may be insufficient to permit formation of a stable RFID tag 1000. In these embodiments, the thickness 1022 of the separator material 1020 may be adapted to improve stability of the RFID tag 1000, and may be rolled to a required or desired thickness. Further, if the separator material 1020 is capable of curing with heat, the roller may be suitably heated for use to both roll and cure the separator material. More specifically, after the separator material 1020 is deposited onto the surface of the non-planar object 1050 at operation 1706, the desired thickness 1022 of the separator material 1020 may be achieved at operation 1708 by, for example, hot roll. The separator material 1020 may also be cured if required or otherwise desired at this stage. At operation 1712, the antenna 1002 may then be sprayed, printed, or otherwise positioned atop the separator material 1020. Then, at operation 1714 (as shown in FIG. 17), a reactive RFID strap 1004 is attached to the separator material 1020 and coupled to the antenna 1002 to create the RFID tag 1000 with a far field antenna response as previously described.

Figure 20A:
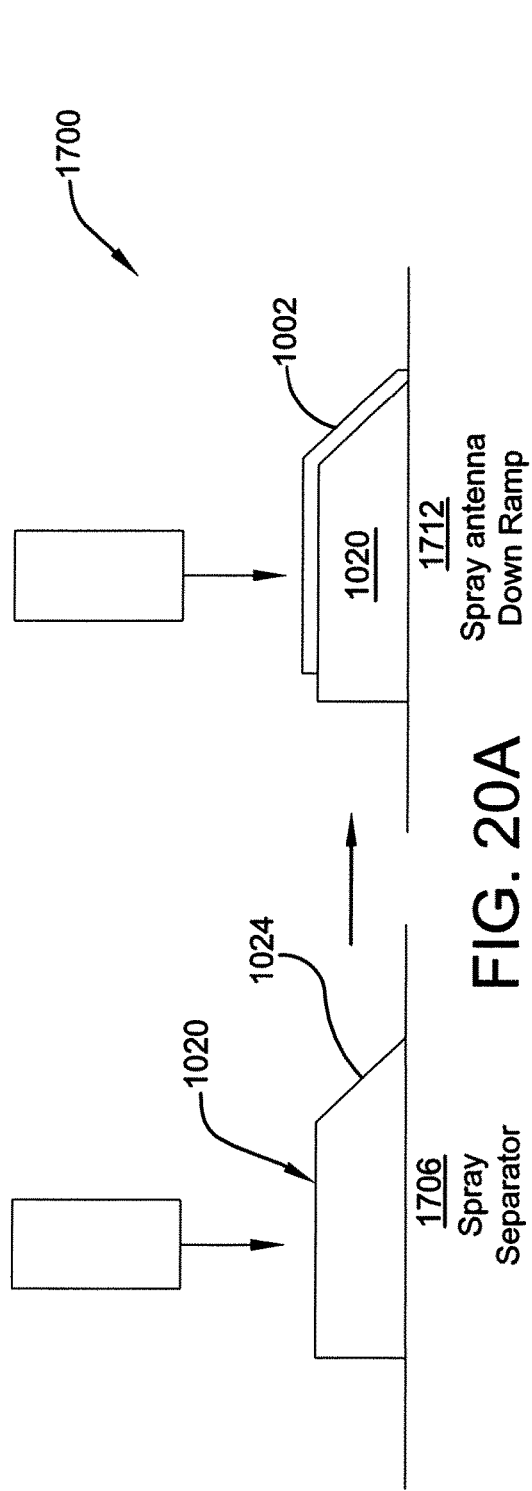
FIG. 20A-B illustrate flowcharts for manufacturing an RFID device involving a separator in accordance with various embodiments.

In some embodiments, such as in FIG. 20A, at least a portion of the antenna structure is deflected with respect to another portion of the antenna structure. The ability to create a deflected antenna structure may be particularly desirable, as successfully creating conductors around sharp corners by printing can be difficult for some processes. In some embodiments, the separator material 1020 may further comprise a ramped portion 1024, and be sprayed or otherwise applied so that the ramped portion 1024 is sloped or tapered downwardly to meet a surface 1052 of the non-planar object 1050. Once the separator material 1020 with the ramped portion 1024 is deposited at operation 1706, the antenna 1002 is printed or sprayed onto the separator material 1020, including down along the ramped portion 1024 and into proximity with and/or contact with the surface 1052 of the non-planar object 1050, as best shown in FIG. 20A at operation 1712. The reactive RFID strap 1004 may then be attached to the separator material 1020 and coupled to the antenna 1002 to create the RFID tag 1000 with a far field antenna response at 1716 as described above. This method may be particularly effective for forming "on-metal" type RFID tags where the non-planar object 1050 has a metallic surface 1052.

Figure 20B:
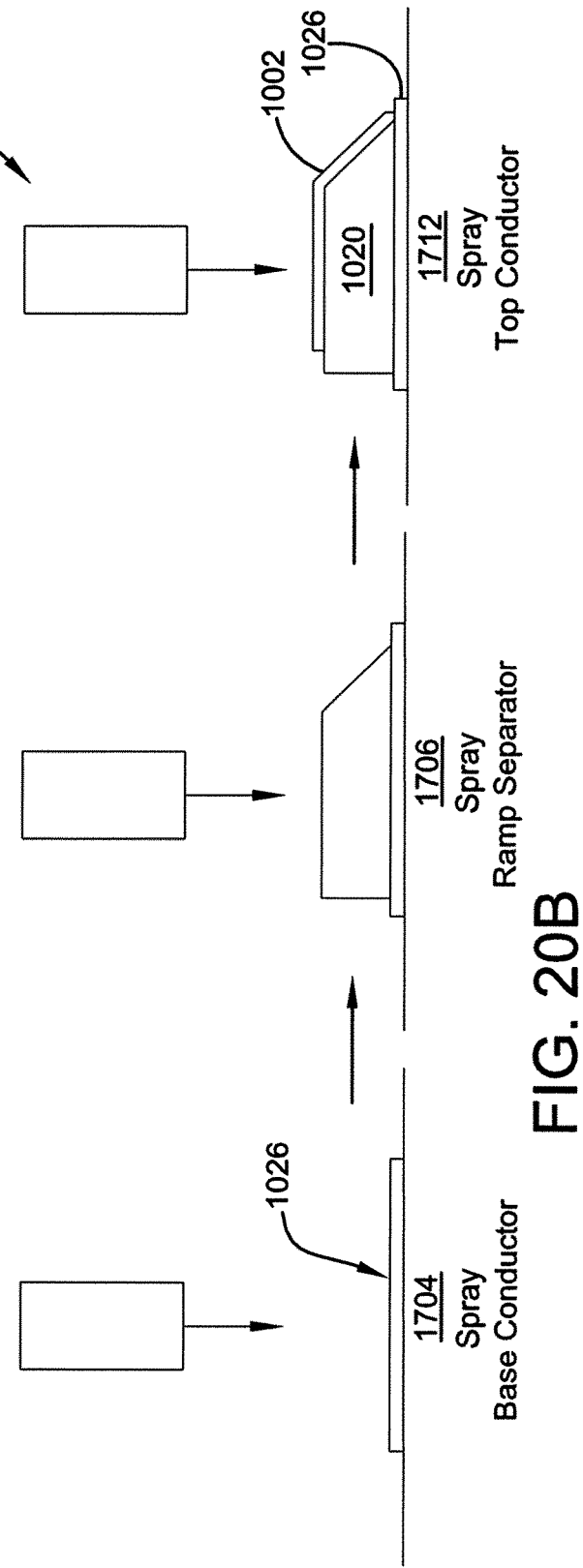

In some embodiments, such as in FIG. 20B, at least a portion of the antenna structure is deflected with respect to the other part of the antenna structure and the RFID tag comprises both a top and a bottom conductor. In some embodiments, the method further comprises first applying a base conductor 1026 to the surface 1052 of the non-planar object 1050 at operation 1704. Then, at operation 1706, the separator material 1020 is sprayed or otherwise deposited atop the base conductor 1026 so that the ramped portion 1024 is sloped downwardly to the base conductor 1026. Once the separator material 1020 with the ramped portion 1024 is deposited at operation 1706, the antenna 1002 and reactive RFID strap 1004 are printed or sprayed onto the separator material 1020 down along the ramped portion 1024 and into proximity with and/or contact with the base conductor 1026 to create the RFID tag 1000 with a far field antenna response at operation 1712. This allows for a RFID tag structure wherein the base conductor 1026 isolates the top conductor (i.e., antenna 1002) acting as the radiating antenna from the non-planar object 1050, and is particularly effective in applications in which the non-planar object 1050 contains a high loss liquid such as water.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of manufacturing a radio frequency identification (RFID) tag on a target non-planar package surface of a package, the method comprising:
   scanning the target surface of the non-planar object to determine a three dimensional shape of the non-planar object;
   selecting a design for an antenna suitable for the target surface, compensating for target surface shape and position, a shape of the antenna being conformable to a shape of the target surface;
   selecting a design of a reactive RFID strap based on one or more of the target surface and the selected antenna, wherein the design of the reactive RFID strap includes surface deflections;
   positioning the antenna on the target surface of the non-planar object;
   positioning the reactive RFID strap on the target surface;
   coupling the reactive RFID strap to the antenna to induce an antenna response; and
   measuring a performance of the RFID tag.

2. The method of claim 1, wherein the target surface is at least one of coupled to or part of a container.

3. The method of claim 1, wherein the container is one of a bag, a box, a bottle, or a can.

4. The method of claim 1, wherein the reactive RFID strap is positioned on the target surface prior to positioning the antenna.

5. The method of claim 1, wherein the reactive RFID strap is coupled to the antenna via an electric field.

6. The method of claim 1, wherein the reactive RFID strap is coupled to the antenna via a magnetic field.

7. The method of claim 1, wherein the reactive RFID strap is coupled to the antenna via both an electric field and a magnetic field.

8. The method of claim 1, wherein the reactive RFID strap is physically coupled to the antenna.

9. The method of claim 1, wherein the antenna is sprayed or printed on the target surface.

10. The method of claim 1, wherein the antenna is formed from a conductive ink.

11. The method of claim 1, further comprising choosing a position for attaching the reactive RFID strap to the surface based on the scanning.

12. The method of claim 1, further comprising:
the target surface by depositing a separator layer on a target area of the non-planar object, the target surface being an external surface of the separator layer.

13. The method of claim 12, wherein a thickness of the separator layer is adapted to improve stability of the RFID tag.

14. The method of claim 12, wherein the separator layer is formed on a supporting surface of the non-planar object and comprises a ramped portion, and
wherein the antenna is deposited onto the ramped portion and the supporting surface.

15. The method of claim 1, further comprising forming the target area by applying a base conductor to a supporting surface of the non-planar object.

16. The method of claim 1, wherein positioning the reactive RFID strap on the target surface includes forming the reactive RFID strap.

17. The method of claim 1, wherein positioning the antenna on the target surface includes forming the antenna.

* * * * *